(12) United States Patent
Miura et al.

(10) Patent No.: US 9,783,646 B2
(45) Date of Patent: Oct. 10, 2017

(54) MOLDING MATERIAL FOR INJECTION MOLDING, EXTRUSION MOLDING OR PULTRUSION MOLDING, CARBON-FIBER-REINFORCED THERMOPLASTIC RESIN PELLET, MOLDING PRODUCT, METHOD FOR PRODUCING INJECTION MOLDED PRODUCT, AND INJECTION MOLDED PRODUCT

(71) Applicant: Teijin Limited, Osaka-shi, Osaka (JP)

(72) Inventors: Kaori Miura, Matsuyama (JP); Katsuaki Yuasa, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 2 days.

(21) Appl. No.: 14/911,398

(22) PCT Filed: Jan. 19, 2015

(86) PCT No.: PCT/JP2015/051202
§ 371 (c)(1),
(2) Date: Feb. 10, 2016

(87) PCT Pub. No.: WO2015/111536
PCT Pub. Date: Jul. 30, 2015

(65) Prior Publication Data
US 2016/0185922 A1 Jun. 30, 2016

(30) Foreign Application Priority Data
Jan. 22, 2014 (JP) ................................. 2014-009516

(51) Int. Cl.
| | |
|---|---|
| *C08K 7/06* | (2006.01) |
| *C08J 5/04* | (2006.01) |
| *C08L 101/00* | (2006.01) |
| *B29C 45/00* | (2006.01) |
| *B29K 101/12* | (2006.01) |
| *B29K 307/04* | (2006.01) |
| *B29L 31/00* | (2006.01) |

(52) U.S. Cl.
CPC .............. *C08J 5/042* (2013.01); *B29C 45/00* (2013.01); *B29C 45/0005* (2013.01); *C08K 7/06* (2013.01); *C08L 101/00* (2013.01); *B29C 2045/0091* (2013.01); *B29K 2101/12* (2013.01); *B29K 2307/04* (2013.01); *B29L 2031/00* (2013.01); *C08J 2300/22* (2013.01)

(58) Field of Classification Search
CPC ......... B29C 45/0005; C08J 5/042; C08K 7/06
USPC .................................. 524/495, 496; 523/220
See application file for complete search history.

(56) References Cited

U.S. PATENT DOCUMENTS

| | | | |
|---|---|---|---|
| 2009/0004453 A1* | 1/2009 | Murai .................. | B29C 43/003 428/299.1 |
| 2013/0192434 A1 | 8/2013 | Hashimoto et al. | |
| 2013/0196154 A1 | 8/2013 | Ortlepp et al. | |

FOREIGN PATENT DOCUMENTS

| | | |
|---|---|---|
| JP | H05116228 A | 5/1993 |
| JP | H07-156146 A | 6/1995 |
| JP | 2002349024 A | 12/2002 |
| JP | 2007254566 A | 10/2007 |
| JP | 2013-519762 A | 5/2013 |
| JP | 2013-133378 A | 7/2013 |
| WO | 2012-086682 A1 | 6/2012 |

OTHER PUBLICATIONS

Apr. 7, 2015—International Search Report—Intl App PCT/JP2015/051202.
Sep. 17, 2015—(PCT/JP) IPER—App 2015/051202—Eng Tran.
Apr. 5, 2016—(JP) Office Action—App 2015-558835.

* cited by examiner

*Primary Examiner* — Edward Cain
(74) *Attorney, Agent, or Firm* — Banner & Witcoff, Ltd.

(57) ABSTRACT

A molding material for injection molding, extrusion molding or pultrusion molding, which contains carbon fibers having a fiber length of 2 mm or more and a thermoplastic resin, wherein (1) the molding material is a solid having a plane $A_1$ and one or more other face $B_i$, one or more cross sections of the carbon fibers are observed in at least one face $B_i$, and the number of the cross sections of the carbon fibers per unit area observed in the face $B_i$ is twice or more the number of the cross sections of the carbon fibers per unit area observed in the plane $A_1$, and (2) a ratio of fibers in which 50% or more of an outer peripheral surface of each carbon fiber is coated with the thermoplastic resin is from 80 to 100% to total carbon fibers.

8 Claims, 8 Drawing Sheets

MOLDING MATERIAL FOR INJECTION MOLDING, EXTRUSION MOLDING OR PULTRUSION MOLDING, CARBON-FIBER-REINFORCED THERMOPLASTIC RESIN PELLET, MOLDING PRODUCT, METHOD FOR PRODUCING INJECTION MOLDED PRODUCT, AND INJECTION MOLDED PRODUCT

CROSS REFERENCE TO RELATED APPLICATIONS

This is a U.S. National Phase Application under 35 U.S.C. §371 of International Application No. PCT/JP2015/051202, filed Jan. 19, 2015, which claims priority to Japanese Application 2014-009516 filed Jan. 22, 2014 and which was published Under PCT Article 21(2), the entire contents of which are incorporated herein by reference.

TECHNICAL FIELD

The present invention relates to a molding material used for injection molding, extrusion molding or pultrusion molding, which is a molding material containing a thermoplastic resin and carbon fibers, having a specific solid shape and composed of a carbon-fiber-reinforced thermoplastic resin.

BACKGROUND ART

In recent years, for example, a carbon-fiber-reinforced thermoplastic resin composite using a thermoplastic resin as a matrix resin has been proposed as one of carbon-fiber-reinforced resin composites from the viewpoint of high-speed moldability. For example, as a material for injection molding, Patent Document 1 proposes a long-fiber pellet obtained by bending thermoplastic resin-impregnated reinforcing fiber tapes containing reinforcing fibers having a length of 1 to 50 mm (in this description, for example, the expression of "1 to 50" should be construed as including 1 and 50) along an orientation direction of the reinforcing fibers and bundling them. Patent Document 1 describes that the fiber length in a molded product thus obtained can be kept long to provide the molded product having high strength and high rigidity, because this long-fiber pellet is easily decomposed when kneaded in an injection molding machine and has high flexibility and the reinforcing fibers are less likely to be bent during injection molding.

Further, Patent Document 2 describes a method for producing a glass-fiber-reinforced plastic regenerated molded article using cut pieces generated at the time of forming sheets for stamping molding.

Patent Document 3 discloses a base material for gutters, which is obtained by impregnating a carbon-fiber mat with a first thermoplastic resin, and thereafter, mixing a powdery or granular material obtained therefrom by pulverization or cutting, with a second thermoplastic resin, followed by melt molding.

CITATION LIST

Patent Documents

Patent Document 1: JP-A-2007-254566
Patent Document 2: JP-A-5-116228
Patent Document 3: JP-A-2002-349024

SUMMARY OF THE INVENTION

Problems that the Invention is to Solve

However, in the long-fiber pellet described in Patent Document 1, although the thermoplastic resin-impregnated reinforcing fiber tapes obtained by impregnating reinforcing fiber bundles with the thermoplastic resin are bundled and fused, and cut to a predetermined length vertically to the orientation direction of the fibers, the coverage of the carbon fibers with the resin is small, so that the mechanical strength after molding has been low. For that reason, sufficient mechanical properties are less likely to be stably obtained, and it has been difficult to obtain a molded product having high mechanical strength.

In the cut pieces described in Patent Document 2, the glass fibers are hardly coated with the thermoplastic resin, so that the fibers are not dispersed at the time of molding, which causes a problem of poor appearance of the molded article. Alternatively, when plasticizing conditions are made sever in order to improve dispersion, the fibers are broken to become short, which causes a problem of decreased strength. Further, the reinforcing fibers are the glass fibers, so that the single fiber thereof is not so thin as that of the carbon fibers. Accordingly, a problem peculiar to the carbon fibers has not occurred that the fiber ratio in the molded article is unstable among shots, because the fibers are entangled with one another to be aggregated at the time of kneading in the case of injection molding, extrusion molding or pultrusion molding.

When the base material described in Patent Document 3 is subjected to injection molding, extrusion molding or pultrusion molding, there is a problem of poor appearance due to poor dispersion, because the coverage of the thermoplastic resin to the carbon fibers is low, or a problem of decreased strength due to shortened fibers for improvement in appearance, as described above.

An object of the present invention is to provide a molding material for injection molding, extrusion molding or pultrusion molding, which is composed of a carbon-fiber-reinforced thermoplastic resin and can produce a molded product having sufficient coverage of a thermoplastic resin to carbon fibers, good appearance and high mechanical strength; a carbon-fiber-reinforced thermoplastic resin pellet; and a fiber-reinforced thermoplastic resin composite material molded product using the molding material.

Means for Solving the Problems

In order to achieve the above-mentioned object, the present invention has the following constitution. That is, 1. A molding material for injection molding, extrusion molding or pultrusion molding, which contains carbon fibers having a fiber length of 2 mm or more and a thermoplastic resin, wherein (1) the molding material is a solid having a plane $A_1$ and one or more other face $B_i$, one or more cross sections of the carbon fibers are observed in at least one face $B_i$, and the number of the cross sections of the carbon fibers per unit area observed in the face $B_i$ is twice or more the number of the cross sections of the carbon fibers per unit area observed in the plane $A_1$, and (2) a ratio of fibers in which 50% or more of an outer peripheral surface of each carbon fiber is coated with the thermoplastic resin is from 80 to 100% to total carbon fibers.

2. The molding material according to the above 1, wherein the solid is a solid having a plane $A_2$ facing the plane $A_1$.

3. The molding material according to the above claim 1 or 2, wherein when melt-kneaded to a dispersion parameter of 0 to 10%, the carbon fibers contained in the melt-kneaded molding material has a weight average fiber length of 0.3 mm or more.

4. A carbon-fiber-reinforced thermoplastic resin pellet for injection molding, extrusion molding or pultrusion molding, which is obtained by melt-kneading the molding material according to any one of the above 1 to 3 alone or with another resin and has a dispersion parameter of 0 to 5%.

5. A molded product molded using the molding material according to any one of the above 1 to 3.

6. A method for producing an injection molded product using a first molding material which is the molding material according to any one of the above 1 to 3, a second molding material which is an optional carbon-fiber-containing molding material and a third molding material which is an optional thermoplastic resin, wherein when an input volume of the first molding material is taken as V1, an input volume of the second molding material is taken as V2, an input volume of the third molding material is taken as V3, a fiber volume ratio of the first molding material is taken as Vf1, a fiber volume ratio of the second molding material is taken as Vf2, and a fiber volume ratio of the molded product is taken as Vfp, Vfp×(V1+V2+V3)/(V1×Vf1+V2×Vf2) is from 0.8 to 1.2, wherein Vf1, Vf2 and Vfp are each defined as described below:

Vf1 represents "the volume of the fibers contained in the first molding material/(the volume of the fibers contained in the first molding material+the volume of the thermoplastic resin contained in the first molding material)";

Vf2 represents "the volume of the fibers contained in the second molding material/(the volume of the fibers contained in the second molding material+the volume of a thermoplastic resin contained in the second molding material)"; and Vfp represents "the volume of the fibers contained in the molded product/(the volume of the fibers contained in the molded product+the volume of the thermoplastic resins contained in the molded product)".

7. The method for producing an injection molded product according to the above 6, wherein the carbon fibers contained in the second molding material have an average fiber length of less than 2 mm.

8. A method for continuously producing injection molded products by using the method according to the above 6 or 7, wherein the molded products produced have a CV value of the fiber volume ratio, Vfp, of 20% or less.

9. An injection molded product obtained using the production method according to any one of the above 6 to 8.

10. The molding material according to any one of the above 1 to 3, wherein the carbon fibers are randomly dispersed in a plane direction parallel to the plane $A_1$.

Advantageous Effects of the Invention

In a molding material of the present invention, carbon fibers are sufficiently coated with a resin, so that a molded product having good appearance and high mechanical strength can be produced. That is, when a fiber-reinforced thermoplastic resin composite material is subjected to injection molding, extrusion molding or pultrusion molding, using the molding material of the present invention, the carbon fibers are already sufficiently coated with the thermoplastic resin. Accordingly, even when molding is performed under mild plasticizing conditions, the fibers are easily dispersed while keeping the carbon fiber length long, and the molded product having excellent appearance and mechanical properties can be obtained.

Further, the carbon fibers contained in the molded product of the present invention are sufficiently coated with the thermoplastic resin, unlike such a conventional sheath-core type long-fiber pellet that fibers are unidirectionally aligned, so that adhesion between the thermoplastic resin and the carbon fibers is high. For this reason, when melt kneading is performed using the molding material of the present invention, the carbon fibers are less likely to fall out from the thermoplastic resin during molding (a supply state of the carbon fibers is excellent). When molding is continuously performed, an effect of stabilizing the volume ratio (Vf) of the fibers contained in the molded product is achieved.

MODE FOR CARRYING OUT THE INVENTION

Respective constituent elements constituting an embodiment according to one mode of the present invention are described.

<Respective Constituent Elements>

Figure 1:
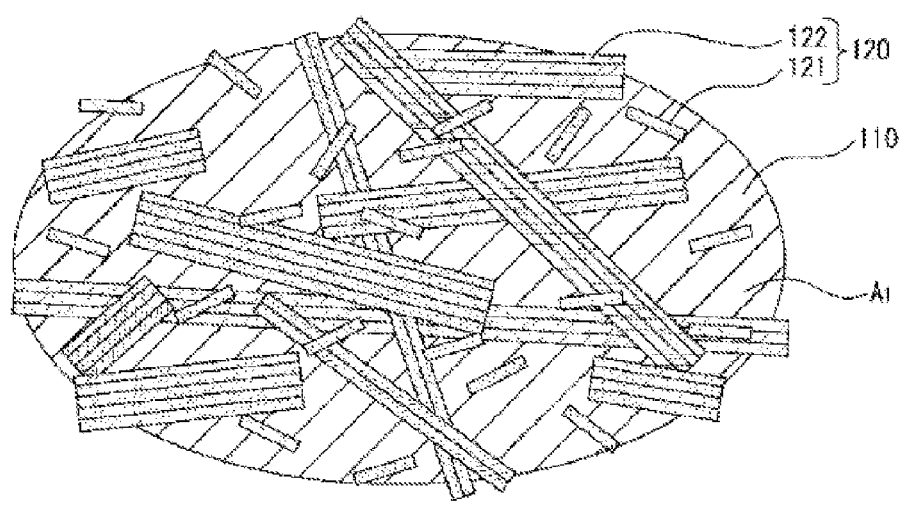
FIG. 1 is a schematic view showing a molding material 100 according to an embodiment, viewed from a plane $A_1$ side.

FIG. 1 is a schematic view showing a molding material 100 according to an embodiment, viewed from a plane $A_1$ side. As shown in FIG. 1, the molding material 100 has a structure in which single fibers 121 and fiber bundles 122 of carbon fibers 120 having various fiber lengths are mixed with a thermoplastic resin 110 used as a matrix resin.

1. Carbon Fiber (1) Material

Polyacrylonitrile (PAN)-based carbon fibers, petroleum-coal pitch-based carbon fibers, rayon-based carbon fibers, cellulose-based carbon fibers, lignin-based carbon fibers, phenol-based carbon fibers, vapor-grown carbon fibers and the like have been generally known as the carbon fibers. In the present invention, all of these carbon fibers can be suitably used.

Above all, the polyacrylonitrile (PAN)-based carbon fibers are preferably used in the present invention in terms of excellent tensile strength. When the PAN-based carbon fibers are used as the carbon fibers, the tensile modulus thereof is preferably within a range of 100 GPa to 600 GPa, more preferably within a range of 200 GPa to 500 GPa, and still more preferably within a range of 230 GPa to 450 GPa. Further, the tensile strength is preferably within a range of 2000 MPa to 10000 MPa, and more preferably within a range of 3000 MPa to 8000 MPa.

(2) Fiber Length

The carbon fibers in the present invention are only required to contain carbon fibers having a fiber length of 2 mm or more, and may contain carbon fibers having a fiber length of less than 2 mm, separately. The fiber length after melt kneading can be kept long by containing the carbon fibers having a fiber length of 2 mm or more. There is no particular limitation on the upper limit of the fiber length. However, from the viewpoint of production, it is preferably 20 mm or less, and more preferably 15 mm or less.

In the present invention, the carbon fibers having fiber lengths different from each other may be used together, and the carbon fibers contained in the molding material 100 may have either a single peak or a plurality of peaks in fiber length distribution.

The weight average fiber length of the carbon fibers contained in the molding material of the present invention is preferably from 0.3 to 20 mm From the viewpoints of excellent strength and fluidity and easy production, the upper limit of the weight average fiber length is preferably 15 mm, and more preferably 10 mm. The lower limit of the weight average fiber length is preferably 0.3 mm, and more preferably 1 mm. The case where the weight average fiber length becomes 2 mm or less is the case where the carbon fibers having a fiber length of 2 mm or less are used together. Further, the weight average fiber length is determined based on the following formula, taking the individual fiber length as Li (mm).

$$\text{Weight average fiber length (mm)}=(\Sigma Li^2)/(\Sigma Li)$$

(3) Fiber Diameter

The fiber diameter of the carbon fibers used in the present invention may be appropriately determined depending on the kind of carbon fiber, and should not be particularly limited. The average fiber diameter is usually preferably within a range of 3 μm to 50 μm, more preferably within a range of 4 μm to 12 μm, and still more preferably within a range of 5 μm to 8 μm. The average fiber diameter of the carbon fibers can be measured, for example, by a method described in JIS R-7607.

(4) Coverage

In the carbon fibers in the present invention, the ratio of fibers in which 50% or more of an outer peripheral surface of each carbon fiber is coated with the thermoplastic resin is from 80 to 100% to the total carbon fibers.

When the carbon fibers are a bundle containing a plurality of single fibers herein, the respective single fibers contained in the bundle should be considered. This indicates that the number of the single fibers in which 50% or more of an outer peripheral surface is coated with the thermoplastic resin in the bundle is from 80 to 100% to the number of the total carbon fibers.

As a method for measuring the coverage, there can be determined the ratio (coverage) of the carbon fibers in which 50% or more (preferably 80% or more and more preferably 90% or more) of an outer peripheral surface of each carbon fiber is coated with the thermoplastic resin to the total carbon fibers present in an observed cross section, when the cross section of a molding material test specimen, having a size of 10 (mm)×t (100 to 250) (μm) at a predetermined magnification (800 times in this embodiment) is observed. Here, the above-mentioned t represents the thickness.

More particularly, first, an epoxy resin mixed with a fluorescent dye is prepared. The molding material test specimen is completely immersed in a bath of the dyed epoxy resin, and subjected to pressure reduction together with the resin bath to perform defoaming, thereby impregnating unimpregnated parts with the dyed epoxy resin. Then, after the unimpregnated parts are impregnated with the dyed epoxy resin, curing is performed, and a cross section is cut out and polished to prepare an observation surface. When this is observed under a microscope, the coverage of the fibers can be measured by observing the dyed epoxy resin, because the color of the matrix resin is different from the dyed epoxy resin in contrast.

The molding material of the present invention in which the carbon fibers are coated with the thermoplastic resin as the matrix resin can be easily produced by cutting the composite material obtained by impregnating the carbon fibers with the thermoplastic resin.

Meanwhile, when the carbon fibers are impregnated with the thermoplastic resin after a sizing agent or a binder is adhered to the carbon fibers, the thermoplastic resin is coated on the sizing agent or the binder in a strict sense, in some cases. These cases should be considered as that the outer peripheral surface of each carbon fiber is coated with the thermoplastic resin.

(5) Sizing Agent

In the present invention, the carbon fibers to which the sizing agent is adhered may be used.

When the carbon fibers to which the sizing agent is adhered are used, the kind of the sizing agent can be appropriately selected depending on the kind of carbon fiber and thermoplastic resin, and should not be particularly limited.

(6) Fiber Volume Ratio

There is no particular limitation on the fiber volume ratio (Vf) of the molding material in the present invention. However, it is preferably from 10 to 60%, more preferably from 20 to 50%, and still more preferably from 25 to 40%, based on the whole molding material. When the fiber volume ratio (Vf) is 20% or more, the mechanical properties of the molded body is particularly improved, and the production of the molding material becomes particularly easy.

2. Thermoplastic Resin

The thermoplastic resin used in the present invention is not particularly limited, and one having a desired softening point or melting point can be appropriately selected and used depending on the use and the like of the molding material.

As the above-mentioned thermoplastic resin, one having a softening point within a range of 180° C. to 350° C. is usually used. However, it should not be limited thereto. The above-mentioned thermoplastic resins include polyolefin resins, polystyrene resins, thermoplastic polyamide resins, polyester resins, polyacetal resins (polyoxymethylene resins), polycarbonate resins, (meth)acrylic resins, polyarylate resins, polyphenylene ether resins, polyimide resins, polyether nitrile resins, phenoxy resins, polyphenylene sulfide resins, polysulfone resins, polyketone resins, polyether ketone resins, thermoplastic urethane resins, fluororesins, thermoplastic polybenzimidazole resins and the like.

The above-mentioned polyolefin resins include, for example, polyethylene resins, polypropylene resins, polybutadiene resins, polymethylpentene resins, vinyl chloride resins, vinylidene chloride resins, vinyl acetate resins, polyvinyl alcohol resins and the like.

The above-mentioned polystyrene resins include, for example, polystyrene resins, acrylonitrile-styrene resins (AS resins), acrylonitrile-butadiene-styrene resins (ABS resins) and the like.

The above-mentioned polyamide resins include, for example, polyamide 6 resins (nylon 6), polyamide 11 resins (nylon 11), polyamide 12 resins (nylon 12), polyamide 46 resins (nylon 46), polyamide 66 resins (nylon 66), polyamide 610 resins (nylon 610) and the like.

The above-mentioned polyester resins include, for example, polyethylene terephthalate resins, polyethylene naphthalate resins, polybutylene terephthalate resins, polytrimethylene terephthalate resins, liquid crystal polyesters and the like.

The above-mentioned (meth)acrylic resins include, for example, polymethyl methacrylate.

The above-mentioned polyphenylene ether resins include, for example, modified polyphenylene ether resins and the like.

The above-mentioned polyimide resins include, for example, thermoplastic polyimides, polyamide imide resins, polyether imide resins and the like.

The above-mentioned polysulfone resins include, for example, modified polysulfone resins, polyether sulfone resins and the like.

The above-mentioned polyether ketone resins include, for example, polyether ketone resins, polyether ether ketone resins, polyether ketone ketone resins and the like.

The above-mentioned fluororesins include, for example, polytetrafluoroethylene and the like.

In the present invention, the thermoplastic resins may be used either alone or in combination of two or more thereof. Embodiments of using two or more kinds of the thermoplastic resins include but are not limited to, for example, an embodiment of using the thermoplastic resins together which have softening points or melting points different from each other, an embodiment of using the thermoplastic resins together which have average molecular weights different from each other, and the like.

3. Other Agents

The molding material may contain an additive such as a non-fibrous filler, a flame retardant, a UV-resistant agent, a pigment, a release agent, a softening agent, a plasticizer or a surfactant, within a range of not impairing the object of the present invention. In particular, when the molded product is produced, the molding material is heated to a temperature equivalent to or higher than the melting point or glass transition point of the thermoplastic resin as the matrix resin. It is therefore preferred that the molding material previously contains an antioxidant or a heat stabilizer.

<Form of Molding Material>

In the present invention, the molding material is a solid having a plane $A_1$ and at least one other face $B_i$, one or more cross sections of the carbon fibers are observed in any face $B_i$, and the number of the cross sections of the carbon fibers per unit area observed in the face $B_i$ is twice or more the number of the cross sections of the carbon fibers per unit area observed in the plane $A_1$.

1. "Solid Having a Plane $A_1$ and at Least One Other Face $B_i$"

The term "plane" here means not having any distinct uneven surface, and it is only required to be visually judged as a plane. The term "plane $A_1$" means any plane constituting an outer surface of the solid. The term "at least one other face $B_i$" means any face for forming the closed solid, other than the plane $A_1$, and the face $B_i$ is only required to be one or more. From the viewpoint of production of the molding material, it is preferred that the molding material has four or more faces $B_i$.

Figure 5A:
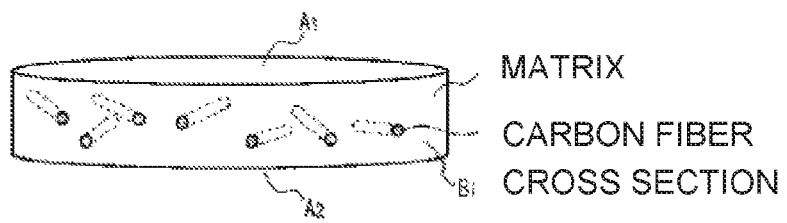
FIGS. 5A, 5B and 5C are conceptual views of shapes of a molding material 100 according to an embodiment.
Figure 5B:
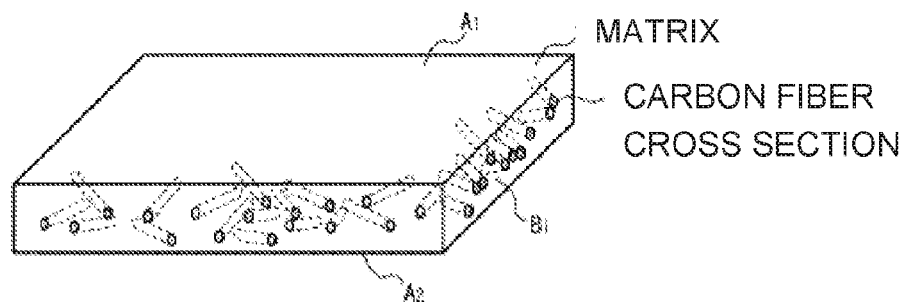
Figure 5C:
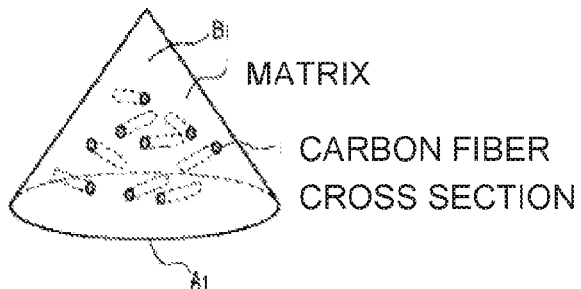

The "solid" in the present invention may have any shape, as long as it has the plane $A_1$ and the at least one other face $B_i$. FIGS. 5A, 5B and 5C show conceptual views of shapes of the molding material 100. Examples thereof include rectangular parallelepiped, cylindrical, plate-like and conical solids, as shown in FIGS. 5A, 5B and 5C, non-uniform shaped solids and the like.

The solid in the present invention is preferred to have a plane $A_2$ facing the plane $A_1$. For "the plane $A_1$ and the plane $A_2$ facing each other", the plane $A_1$ and the plane $A_2$ may be either parallel or non-parallel planes. However, from the viewpoint of easy production of the molding material, the parallel planes are preferred. For "facing each other", the angle between the two planes is only required to be 60° or less. More preferably, the angle between the plane $A_1$ and the plane $A_2$ facing each other is preferably 45° or less, more preferably 30° or less, and still more preferably 20° or less.

2. "One or More Cross Sections of the Carbon Fibers are Observed in any Face $B_i$"

For the face $B_i$, one or more cross sections of the carbon fibers having a fiber length of 2 mm or more are observed in any face $B_i$. From the viewpoint of production of the molding material, the number of cross sections of the carbon fibers observed in any face $B_i$ is preferably 100 or more per $mm^2$, from the viewpoint of production, more preferably 300 or more, and still more preferably 700 or more. Further, from the viewpoint of production, it is preferred that one or more cross sections are observed not only in any face $B_i$, but also in all faces $B_i$.

For the cross-sectional shape of the carbon fiber observed, the cross-sectional shape that appears when cut perpendicularly to the fiber direction of the carbon fiber may be observed as it is, or the cross-sectional shape cut obliquely to the fiber direction may be observed. Accordingly, the cross section of the carbon fiber observed in the face $B_i$ may be either a perfect circle or an ellipse, regardless of the cross-sectional shape of the carbon fiber.

3. "the Number of the Cross Sections of the Carbon Fibers Per Unit Area Observed in the Face $B_i$ is Twice or More the Number of the Cross Sections of the Carbon Fibers Per Unit Area Observed in the Plane $A_1$"

The number of the cross sections of the carbon fibers per unit area observed in the face $B_i$ in the present invention is twice or more the number of the cross sections of the carbon fibers per unit area observed in the plane $A_1$. The reason for this is that in terms of obtaining raw materials, it is preferred that the carbon fibers contained in the molding material are oriented randomly in a two-dimensional direction or aligned uniaxially, because a two-dimensional material or a unidirectional material is likely to be available in the market in large amounts as the carbon-fiber-reinforced thermoplastic resin composite.

"The number of the cross sections of the carbon fibers per unit area observed" is determined by performing observation under an optical microscope, randomly selecting ten places having a range of 0.1 mm×0.1 mm, measuring the number of the cross sections of the carbon fibers contained within that range, and dividing this number by the area of each observation visual field, followed by averaging.

The carbon fibers having such a form mean a unidirectional arrangement in which a long axis direction of the fibers is unidirectionally arranged in the molding material or a two-dimensional random arrangement in which the above-mentioned long axis direction is randomly arranged in an in-plane direction of the composite material. Although described later, the molding material in the present invention is obtained by cutting a plate-like molding material precursor with a two-dimensional random orientation or a unidirectional alignment, leaving a plate surface and/or back surface of the plate-like precursor, so that there is a combination of the plane $A_1$ and the face $B_i$ in which the number of the cross sections of the carbon fibers per unit area observed in the face $B_i$ is twice or more, and usually 100 times or more, the number of the cross sections of the carbon fibers per unit area observed in the plane $A_1$. For example, in this embodiment, it distributes within a range of 380 to 650 times. That is, the number of the cross sections of the carbon fibers per unit area observed in the face $B_i$ is dependent on the content of the carbon fibers contained in the plate-like molding material precursor before cutting.

On the other hand, the number of the cross sections of the carbon fibers per unit area observed in the plane $A_1$ becomes zero, when the completely two-dimensionally oriented or one-dimensionally aligned molding material precursor is used. When the number of the cross sections of the carbon fibers observed in the plane $A_1$ is zero, the number of the cross sections of the carbon fibers observed in the face $B_i$ becomes infinite times the number of the cross sections of the carbon fibers observed in the plane $A_1$.

The molding material of the present invention may contain carbon fibers having a fiber length of less than 2 mm within a range of achieving the effect of the present invention.

In contrast, a pellet produced by extrusion molding of the composition containing the carbon fibers and the thermoplastic resin usually has a cylindrical shape in many cases, and many cross sections of the carbon fibers are observed in upper and bottom surfaces of the cylinder corresponding to the plane $A_1$ and the plane $A_2$. However, the cross sections of the carbon fibers per unit area observed in a side surface of the cylinder corresponding to the face $B_i$ are few. For this reason, the number of the cross sections of the carbon fibers per unit area observed in the face $B_i$ does not become twice or more the number of the cross sections of the carbon fibers per unit area observed in the plane $A_1$.

Figure 7:
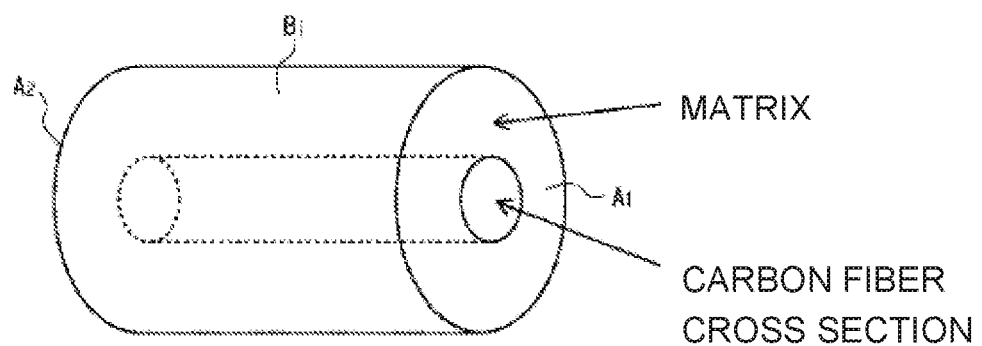
FIG. 7 is a schematic diagram showing a conventional sheath-core type molding material.

FIG. 7 is a schematic diagram showing a conventional sheath-core type molding material. A cylindrical sheath-core type carbon fiber pellet shown in FIG. 7 as a known technique comprises a carbon fiber bundle usually composed of about 1000 to 100000 single fibers as a core portion and a thermoplastic resin as a sheath portion, so that the ratio of the fibers in which 50% or more of an outer peripheral surface of each carbon fiber is coated with the thermoplastic resin to the total carbon fibers is less than 80%. For this reason, when the fibers are impregnated with the resin, strong shear stress becomes necessary to cause the fiber length to be shortened at the time of molding.

4. Relationship Between the Plane $A_1$ and the at Least One Other Face $B_i$

In the present invention, the plane $A_1$ and the at least one other face $B_i$ are only required to be any plane $A_1$ constituting an outer surface of a solid and at least one other face $B_i$. There are a plurality of combinations of the plane $A_1$ and the face $B_i$, and the solid is only required to have a combination of the plane $A_1$ and the face $B_i$ satisfying the relationship between the plane $A_1$ and the face $B_i$, which is defined in the present invention, in at least one place.

<Assembly of Molding Materials>

The molding materials in the present invention are preferably used as an assembly. In the assembly, the ratio of the molding materials satisfying the following condition (3) to the molding materials satisfying the following condition (4) but condition (3) is preferably from 1:99 to 99:1, more preferably from 20:80 to 80:20, and still more preferably from 40:60 to 80:20.

Condition (3): the ratio of the fibers in which 50% or more of an outer peripheral surface of each carbon fiber is coated with the thermoplastic resin is from 80 to 100% to the total carbon fibers.

Condition (4): the ratio of the fibers in which 50% or more of an outer peripheral surface of each carbon fiber is coated with the thermoplastic resin is less than 80% to the total carbon fibers.

<Size of Respective Molding Materials Constituting Assembly>

Figure 8A:
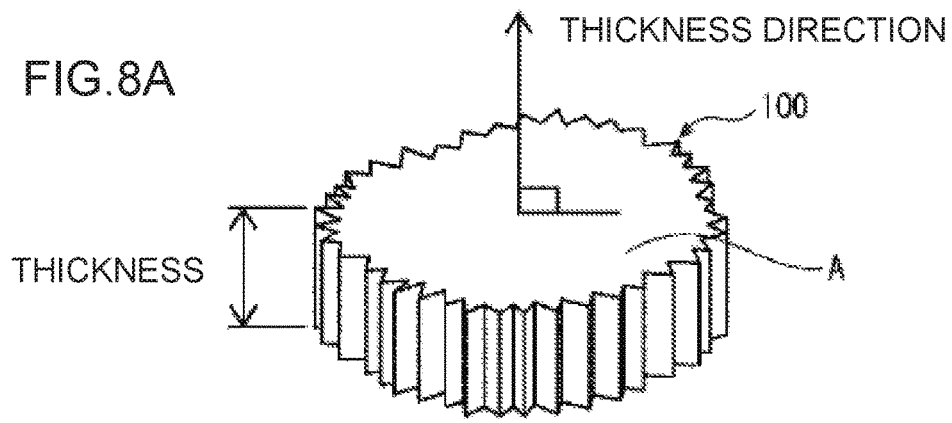
FIGS. 8A and 8B is schematic diagrams showing a minimum circumscribed circle of a molding material 100.
Figure 8B:
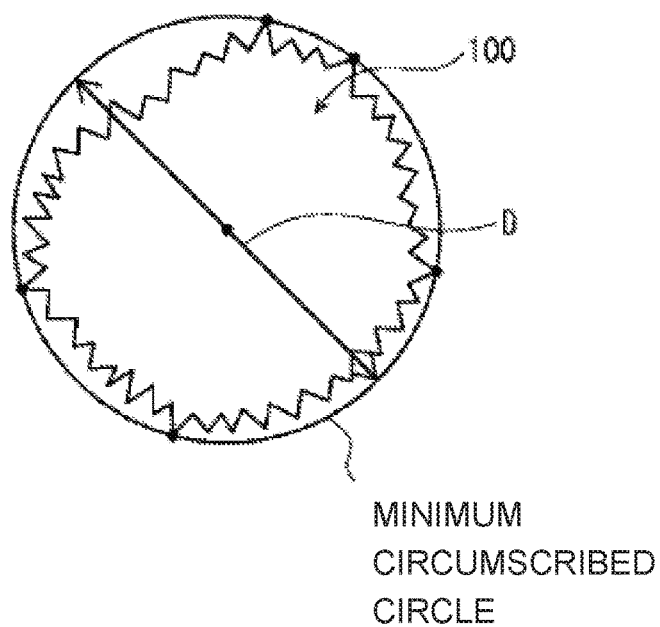

There is no particular limitation on the size of the respective molding materials constituting the assembly. However, preferably, among the planes of the above-mentioned molding material, the weight ratio of the molding material in which the diameter of a minimum circumscribed circle of a plane having a maximum area is from 8 to 20 mm and the molding material in which the diameter of the minimum circumscribed circle is less than 8 mm is preferably from 30:70 to 70:30, and more preferably from 45:55 to 60:40. FIGS. 8A and 8B are schematic diagrams showing the minimum circumscribed circle of the molding material 100. Here, the minimum circumscribed circle of the plane having the maximum area, among the solid planes, means the minimum circumscribed circle of a plane having the maximum area of the molding material, as shown in FIG. 8B.

When the molding material used in the present invention is plate-like, the plate thickness should not be particularly limited. However, it is usually preferably within a range of 0.01 mm to 100 mm, preferably within a range of 0.01 mm to 3 mm, and more preferably within a range of 0.1 to 1.5 mm.

<Dispersion Parameter>

It is preferred that the molding material in the present invention contains the carbon fibers having a weight average fiber length of 0.3 mm or more in the melt-kneaded molding material (also referred to as the resin composition) at the time when the above-mentioned molding material is melt kneaded to a dispersion parameter of 0 to 10%.

The "dispersion parameter" as used herein is an index representing a variation in the weight content of carbon fibers contained in a fiber-reinforced thermoplastic resin composition, and in the present invention, it represents a measured value of a variation in the number of carbon fibers in the cut face of the molding material as the fiber-reinforced thermoplastic resin composition. A measuring method of the dispersion parameter comprises the steps of cutting out a part from the molding material (fiber-reinforced thermoplastic resin composition) after melt kneading, polishing the cut face thereof, performing observation under an optical microscope, randomly selecting ten places having a range of 0.1 mm×0.1 mm, and measuring the number of the carbon fibers contained within that range. Taking as A the average value of the numbers of the carbon fibers in the ten places selected, and taking the standard deviation as S, the dispersion parameter is determined by the following formula:

Dispersion parameter=$100 \times S/A$ (unit:%)

The molding material of the present invention is utilized, for example, after the molding material precursor is previously pressed to increase the degree of impregnation, as described later, so that even when melt kneading is performed to a dispersion parameter of 0 to 10%, the carbon fibers having a relatively long fiber length can be left.

As a more preferred embodiment, from the viewpoint of securing mechanical properties, when the molding material is melt kneaded to a dispersion parameter of 0 to 10% and the fiber length is measured for a melt of the resulting molding material, the weight average fiber length is preferably 0.3 mm or more, more preferably 0.5 mm or more, and still more preferably 1.0 mm or more.

<Thermoplastic Resin Pellet>

Further, in the present invention, carbon-fiber-reinforced thermoplastic resin pellets obtained by melt kneading the above-mentioned molding material alone or one having another resin or an additive added thereto, having a dispersion parameter defined above of 0 to 5%, can be utilized for injection molding, extrusion molding or pultrusion molding.

<Method for Producing Molding Material>

1. Summary

There is no particular limitation, as long as it is a method for producing a molding material having such a high coverage that the ratio of the fibers in which 50% or more of an outer peripheral surface of each carbon fiber is coated with the thermoplastic resin is from 80 to 100% to the total carbon fibers. For example, it may be a method of preparing a molding material precursor, and impregnating the carbon fibers with the thermoplastic resin by pressing this precursor.

The thermoplastic resin precursor should not be particularly limited, and there can also be used various materials, for example, such as a composite material containing 10 to 70 wt % of carbon fibers, which is described in JP-A-2011-178890 or JP-A-2011-178891, and one combined with a unidirectional carbon-fiber-reinforced composite material, which is described in JP-A-2011-241338.

An example thereof is described below.

2. Method for Producing Molding Material Precursor as Raw Material for Production of Molding Material (1) Method for Producing Random Mat Molded Product For the molding material precursor as a raw material for production of an assembly of the molding materials 100 of this embodiment, there can be used one in which carbon fiber bundles composed of a plurality of carbon fibers having a predetermined length and randomly oriented and resin pieces composed of a thermoplastic resin are present in a mixed state without being joined to each other, which is called a "random mat".

The term "random mat molded product" means one in which a part or the whole of the resin pieces in the random mat are melted to be joined to the carbon fiber bundles.

An example of a method for preferably obtaining the random mat molded product is described below. The random mat molded product can be preferably produced, for example, by the following steps 1 to 5 described in JP-A-2013-49208. A production process of the random mat molded product comprises the following steps:

1. a step of feeding the carbon fibers from a creel part, widening them with a widening device, and thereafter, opening them through a yarn guide and a longitudinal slit device to form a carbon fiber bundle, 2. a cutting-opening step of cutting the carbon fiber bundle, introducing the carbon fiber bundle cut (hereinafter referred to as "fiber bundle pieces") into a tube body of a cutting-opening device and opening the fiber bundle pieces separately to some degree by blowing the air to the fiber bundle pieces, 3. a scattering step of scattering the fiber bundle pieces which have finished the opening step, onto an air-permeable support with diffusing, together with the fibrous or powdery thermoplastic resin supplied from a resin supply part, while suctioning through a suction apparatus.

4. a fixing step of fixing the scattered carbon fiber bundle and thermoplastic resin by heating with a preheating device to obtain the random mat, and 5. a press step of press molding the resulting random mat to obtain the random mat molded product.

The plate-like random mat molded product in which the long axis direction of the fibers is randomly arranged in the in-plane direction of the composite material is obtained by the steps described above.

(2) Method for Producing Unidirectional Fiber-Reinforced Composite Material

Figure 2:
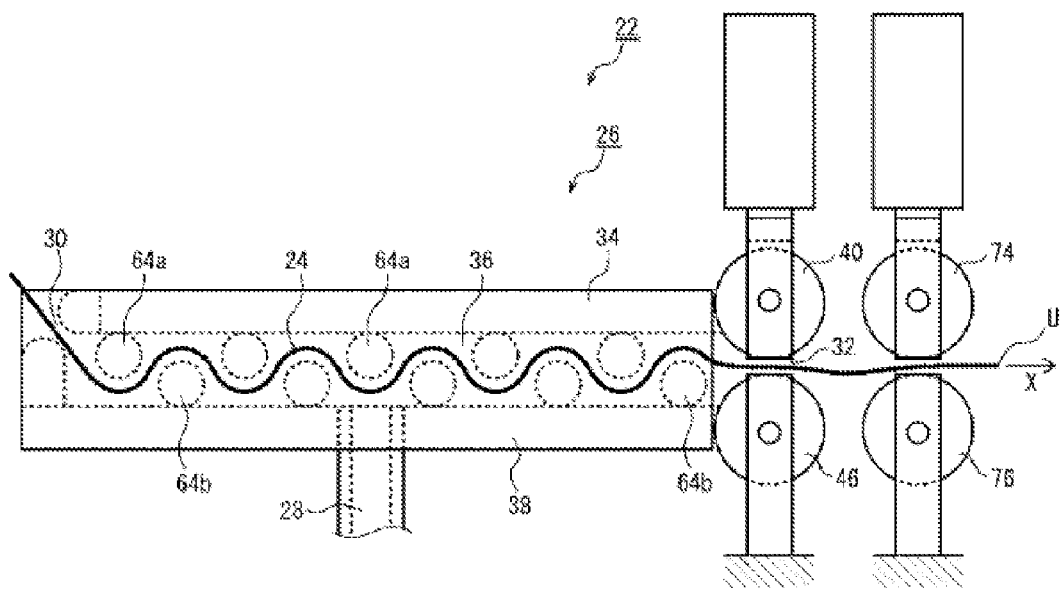
FIG. 2 is a schematic view showing a production process of a unidirectional fiber-reinforced composite material.

The term "unidirectional fiber-reinforced composite material" is a fiber-reinforced composite material having a structure in which unidirectionally continuous long fibers and a thermoplastic resin are mixed. This unidirectional fiber-reinforced composite material can be preferably produced, for example, by a production method described in JP-A-2007-254566 or the like. FIG. 2 is a schematic view showing a production process of the unidirectional fiber-reinforced composite material. In FIG. 2, 22 is a production apparatus of the unidirectional fiber-reinforced composite material. 26 is a nearly rectangular parallelepiped molten resin impregnation apparatus, which comprises a box-shaped upper mold part 34 whose bottom face is opened and a box-shaped lower mold part 38 whose top face is opened, and the upper mold part 34 and the lower mold part 38 are fitted to each other, thereby forming a space part 36 in the inside thereof. 28 is a resin supply passage for supplying a molten thermoplastic resin. A nozzle upper member 40 composed of a roller is fixed to a downstream side end part of the upper mold part 34. A nozzle lower member 46 composed of a roller is fixed to a downstream side end part of the lower mold part 38. The nozzle upper member 40 and the nozzle lower member 46 are both heated to a temperature of the inside of the molten resin impregnation apparatus 26 to a temperature near the melting point of the resin, Further, cooling rollers 74 and 76 adjusted to a temperature of around 20° C. are provided immediately downstream thereof.

In this production apparatus 22, a carbon fiber bundle 24 is supplied from an upstream side slit nozzle 30 to the space part 36 of the resin impregnation apparatus, in a form of a bundle composed of 12000 or more single fibers, preferably 12000 to 50000 single fibers. The carbon fiber bundle 24 running through the space part 36 of the resin impregnation apparatus is extended while being pressed to rubbing bar materials 64a, 64b and running zigzag, and impregnated with the molten thermoplastic resin. The carbon fiber bundle 24 impregnated with the molten thermoplastic resin is allowed to pass through a downstream side slit nozzle 32 and drawn out in the arrow X direction in a form of a wide thin tape. Thereby, the unidirectional fiber-reinforced composite material (U) is obtained which is composed of 12000 or more reinforcing fibers oriented in parallel to one another and has a tape width of 10 mm or more and a tape thickness of 200 μm or less.

3. Method for Producing Molding Material

Figure 3:
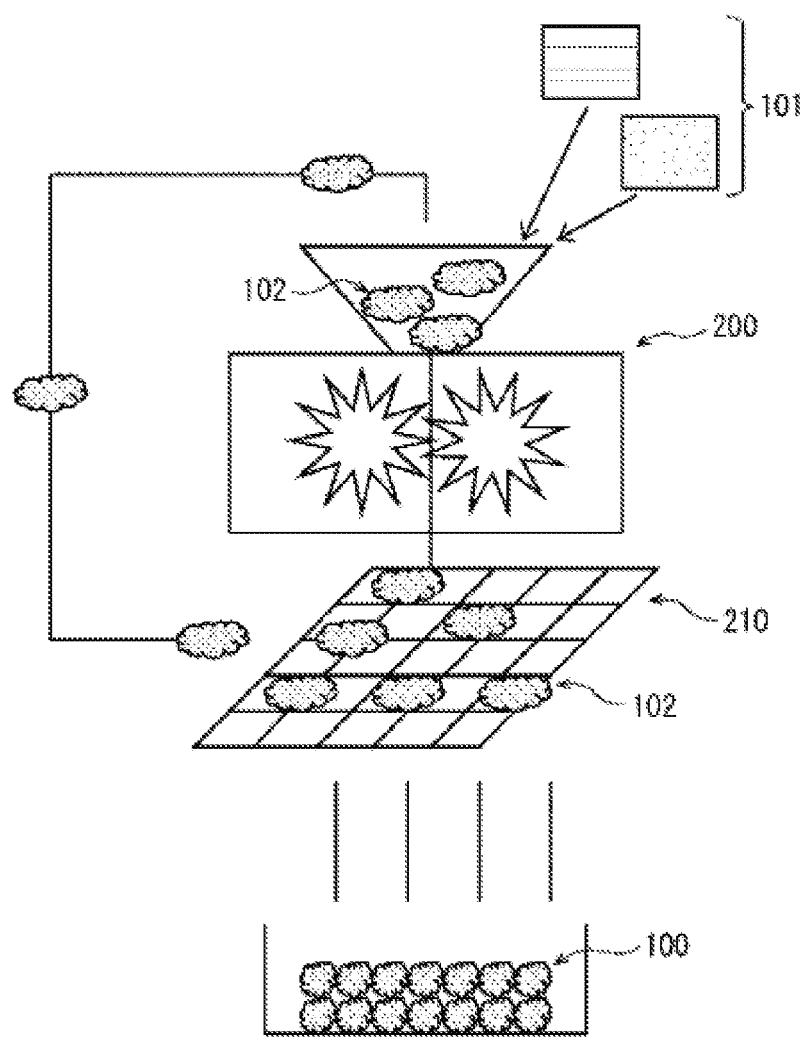
FIG. 3 is a schematic view showing a structure of a pulverizer used for the production of a molding material 100 of an embodiment.

FIG. 3 is a schematic view showing a structure of a cutter 200 used for the production of the molding material 100 of the embodiment. The cutter 200 is a commercially available plastic cutter. Composite material broken materials 101 such as broken materials, waste materials or production waste materials of the random mat molded product and the unidirectional fiber-reinforced composite material U are supplied to the cutter 200 and cut.

Adjustment to such conditions that the volume of cut pieces 102 falls within the preferred size range of the above-mentioned molding material can be performed by appropriately changing the cutting blade size, the cutting blade distance, the pulverization time and the number of rotations and measuring the volume distribution of the cut pieces. Further, the cut pieces 102 are allowed to pass through a filter 210, and the cut pieces having a particle size equal to or less than the specific value are recovered as the molding material 100. The cut pieces 102 not passing through the filter 210 are supplied again to the cutter 200, and subjected to cutting. By adjusting the opening area of the filter 210 as described above, the molding material according to this embodiment can be obtained. For the assembly of the molding materials, among the planes of the above-mentioned molding material, the weight ratio of the molding material in which the diameter of a minimum circumscribed circle of a plane having a maximum area is from 8 to 20 mm and the molding material in which the diameter of the minimum circumscribed circle is less than 8 mm can be adjusted to the above-mentioned range.

<Molding Method>

The molding method of the present invention relates to injection molding, extrusion molding or pultrusion molding. In these molding methods, a kneading process is present until molding, and there is a step of impregnating the carbon fibers with the resin. In the case where the molding material according to the present invention is used, the resin is impregnated even at low shear force in the kneading process. Accordingly, even when subjected to injection molding, extrusion molding or pultrusion molding, the fiber length can be left long.

<Molded Product Produced Using Assembly Containing Molding Materials>

An example of melting the thermoplastic resin by heating the assembly of the molding materials obtained by the above-mentioned molding material production method and molding the kneaded product by injecting it into an injection mold is described below.

Figure 4:
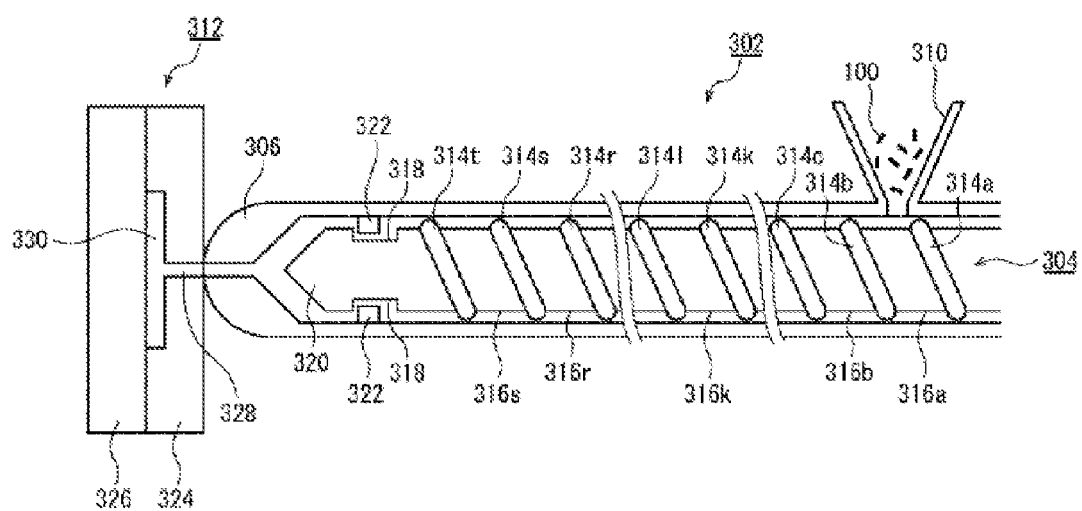
FIG. 4 is a schematic cross-sectional view showing a structure of an injection molding machine using a molding material 100 of an embodiment.

FIG. 4 is a schematic cross-sectional view showing a structure of an injection molding machine using the molding material 100 of this embodiment. As the injection molding machine, known one as shown in FIG. 4 can be used.

In FIG. 4, 302 is the injection molding machine, which comprises a screw main body 304 and a heating cylinder 306. On the screw main body 304, flights 314a, 314b, 314c, . . . , 314k, 314l, . . . , 314r, 314s and 314t are formed from the side of a hopper 310 to which the assembly of the molding materials 100 is supplied (upstream side) to the side of a mold 312 (downstream side), and screw grooves 316a, 316b, . . . , 316k, . . . , 316r and 316 s are formed between the respective flights.

A screw head 320 is formed on the downstream side of the screw main body 304 with the interposition of a small diameter part 318. A check ring 322 is formed in the heating cylinder 306 at a position opposite to the small diameter part 318.

The mold 312 includes a front mold 324 and a rear mold 326. The kneaded product of the assembly of the molding materials 100 supplied from a gate 328 is introduced into a gap 330 between the front mold and the rear mold, and the molded product is obtained herein.

The assembly of the molding materials 100 supplied from the hopper 310 is homogeneously melted in the heating cylinder 306 by a heat-melting action from the outside, shear heat generation of the materials themselves, and a kneading action associated with rotation of the screw main body 304. The kneaded product thus obtained is sent into the mold 312 through the check ring 322.

At this time, it is necessary to sufficiently impregnate the carbon fibers with the thermoplastic resin by kneading the resin by shear flow. Conventionally, the fibers are easily broken by shear force at the time of the shear flow, and the fiber length of the carbon fibers in the resulting fiber-reinforced thermoplastic resin composite material molded product is decreased. There is therefore a possibility that the mechanical characteristics of the molded product are deteriorated.

In contrast, in the assembly of the molding materials 100 of this embodiment, the carbon fibers are sufficiently coated with the thermoplastic resin in the production step of the random mat molded product as the raw material for production of the assembly of the molding materials 100 or the unidirectional fiber-reinforced composite material, as described above. For this reason, even when the thermoplastic resin is kneaded by low shear force at the time of shear flow by the screw main body 304, the molded product having good appearance in which the carbon fibers are sufficiently dispersed in the thermoplastic resin can be obtained, and the fiber length of the carbon fibers in the molded product is left long, so that the mechanical characteristics can also be kept high.

<Method for Producing Injection Molded Product>

A method for producing an injection molded product of the present invention is a method for producing a molded product using a first molding material as the molding material in the present invention, a second molding material as an optional carbon fiber-containing molding material and a third molding material as an optional thermoplastic resin, wherein when the input volume of the first molding material is taken as V1, the input volume of the second molding material is taken as V2, the input volume of the third molding material is taken as V3, the fiber volume ratio of the first molding material is taken as Vf1, the fiber volume ratio of the second molding material is taken as Vf2, and the fiber volume ratio of the molded product is taken as Vfp, Vfp×(V1+V2+V3)/(V1×Vf1+V2×Vf2) is from 0.8 to 1.2, wherein, Vf1, Vf2 and Vfp are each defined as described below:

Vf1=the volume of the fibers contained in the first molding material/(the volume of the fibers contained in the first molding material+the volume of the thermoplastic resin contained in the first molding material), Vf2=the volume of the fibers contained in the second molding material/(the volume of the fibers contained in the second molding material+the volume of a thermoplastic resin contained in the second molding material), and Vfp=the volume of the fibers contained in the molded product/(the volume of the fibers contained in the molded product+the volume of the thermoplastic resins contained in the molded product).

Vfp×(V1+V2+V3)/(V1×Vf1+V2×Vf2) showing a relationship among the fiber volume ratio Vf1 of the first molding material, the fiber volume ratio Vf2 of the second molding material and the fiber volume ratio Vfp of the molded product satisfies 0.8 to 1.2. That is, this means that the fiver volume ratio of the molded product becomes approximately equal to the fiber volume ratio of the molding material. Conventionally, when the molding material containing the carbon fibers having a relatively long fiber length is used, the fiber volume ratio of the molded product tends to become unstable. However, when the molding material of the present invention is used, the fiver volume ratio of the molded product is approximately equal to the fiber volume ratio of the molding material. Accordingly, the molded product having a desired fiver volume ratio is stably obtained.

<Second Molding Material>

The above-mentioned second molding material is arbitrary, so that the second molding material may be either used or not, in the method for producing an injection molded product of the present invention.

Although there is no particular limitation on the average fiber length of the carbon fibers contained in the above-mentioned second molding material, it is preferably less than 2 mm, more preferably less than 1 mm, and still more preferably less than 0.5 mm.

There is no particular limitation on the thermoplastic resin contained in the above-mentioned second molding material, and specific examples and preferred ranges thereof are the same as in the case of the thermoplastic resin of the first molding material.

There is no particular limitation on the production method of the second molding material. One obtained by more finely pulverizing the first molding material is preferred, because additional equipment and technology are less required.

<Third Molding Material>

The above-mentioned third molding material is arbitrary, so that the third molding material may be either used or not, in the method for producing an injection molded product of the present invention.

There is no particular limitation on the thermoplastic resin contained in the above-mentioned third molding material, and specific examples and preferred ranges thereof are the same as in the case of the thermoplastic resin of the first molding material.

<CV Value of Fiber Volume Ratio (Vfp) of Each Molded Product Produced>

When the molded product is continuously produced using the molding material in the present invention, the CV value of the fiber volume ratio (Vfp) of each molded product produced is preferably 20% or less, more preferably 15% or less, and still more preferably 10% or less.

The CV value as used herein is the inter-shot variation coefficient of the carbon fiber volume ratio (Vfp) of the resulting molded product. The smaller this value is, the smaller the inter-shot variation of the carbon fiber volume ratio (Vfp) is. This means that the molded product having a constant fiber volume ratio (Vfp) can be stably obtained.

It is preferred that the carbon fibers contained in the molding material in the present invention are not unidirectionally arranged in parallel and are randomly dispersed in a plane direction in parallel to the plane $A_1$. In this case, a phenomenon that the carbon fibers "fall out" from the thermoplastic resin during kneading is less likely to occur, compared to the case where the carbon fibers are arranged in parallel in the pellet, because the fibers do not face unidirectionally in the molding material.

Meanwhile, the plane direction in parallel to the plane $A_1$ is the in-plane direction of the molding material, when there is the facing plane $A_2$.

EXAMPLES

1. Preparation of Molding Material 1. 1 Preparation of Assembly of Molding Materials 100-1

Carbon fiber "Tenax" (registered trade mark) STS40-24K (average fiber diameter: 7 µm, fiber width: 10 mm) manufactured by Toho Tenax Co., Ltd., which was opened to a fiber width of 20 mm, was used as the carbon fibers. A rotary cutter was used as a cutting device, the pitch of blades was 10 mm, and the carbon fibers were cut to a fiber length of 15 mm.

Particles obtained by freeze-pulverizing nylon 6 resin (PA 6) "UBE Nylon" (registered trade mark) 1015B pellets manufactured by Ube Industries, Ltd. were used as the thermoplastic resin. Then, the supply amount of the carbon fibers was set to 200 g/min, and the supply amount of the matrix resin was set to 450 g/min. An apparatus was operated to obtain a random mat having a fiber areal weight of 240 g/m$^2$, in which the carbon fibers and the thermoplastic resin (nylon 6) were mixed. Three sheets of the resulting random mats were stacked, and heated at 2 MPa for 3 minutes with a press apparatus heated to 260° C. to obtain a random mat molded product having a thickness of 2.5 mm.

The resulting molded product was cut with a cutter, thereby producing an assembly of molded products 100-1. One was randomly taken out from the assembly of the molding materials. As a result, it had the shape of 100-1 in FIG. 6. Further, the fiber volume ratio (Vf1) of the molding material 100-1 was measured. As a result, it was 33%.

1. 2 Preparation of Assemblies of Molding Materials 100-2 and Molding Materials 100-3

Figure 6:
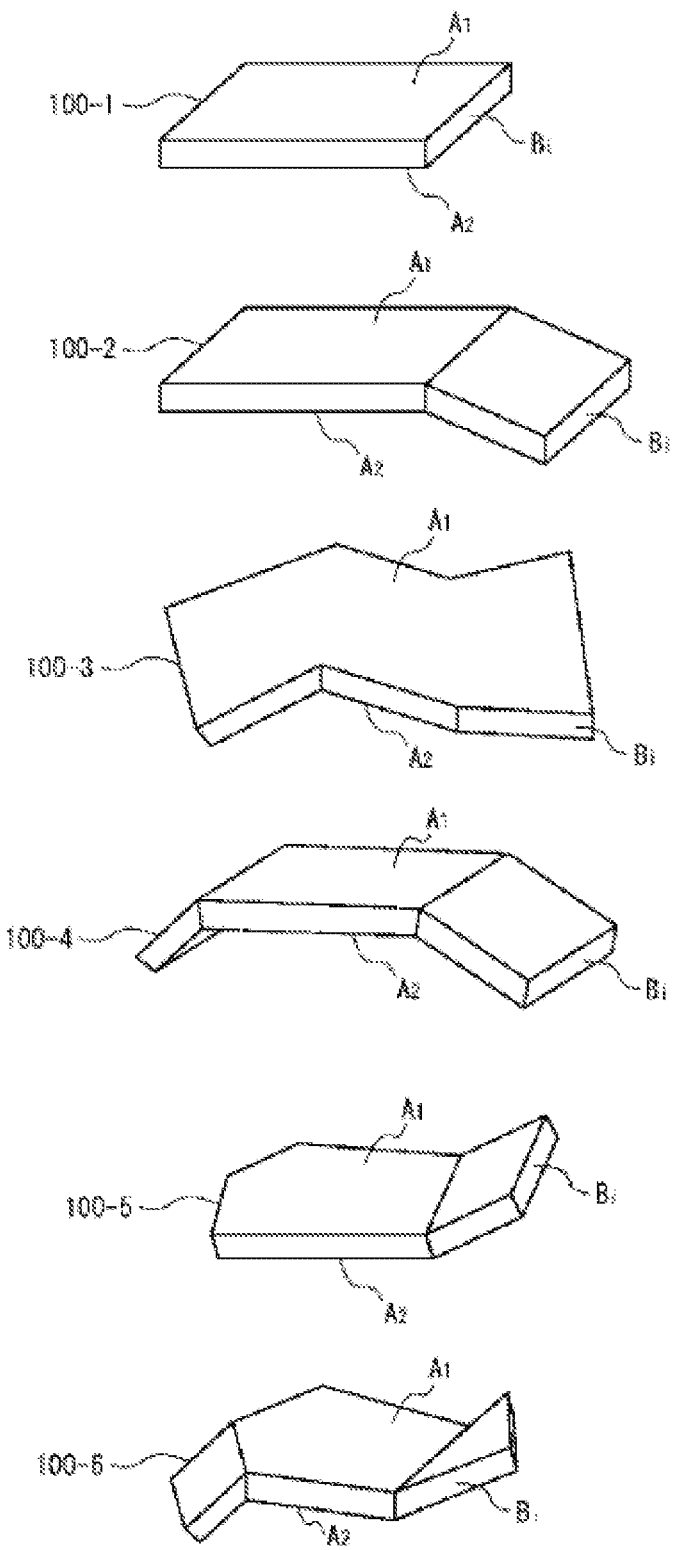
FIG. 6 is schematic diagrams showing shapes of molding materials according to Examples and comparative molding materials.

The molded products were cut to produce assemblies of molding materials 100-2 and molding materials 100-3, and two arbitrary molding materials were taken out. As a result, they were molding materials having the shapes of 100-2 and 100-3 shown in FIG. 6 (FIG. 6 is schematic diagrams showing shapes of molding materials according to Examples and comparative molding materials). Further, the fiber volume ratio (Vf1) of the molding material 100-2 and the molding material 100-3 was measured. As a result, it was 34%.

All of the molding materials 100-1 to 100-3 had an average thickness of 2.5 mm.

1. 3 Preparation of Assembly of Molding Materials 100-4

A molding material was prepared in the same manner as in 1. 1 with the exception that when the random mat molding material was produced, the coverage of the carbon fibers was increased to 95% by performing pressing at 2 MPa for 6 minutes, and an assembly of molding materials 100-4 was produced. One was arbitrarily taken out from the assembly of the molding materials 100-4. As a result, it had the shape shown in 100-4 of FIG. 6.

1. 4 Preparation of Assembly of Molding Materials 31

A molding material was prepared in the same manner as in 1. 1 with the exception that the fiber volume ratio (Vf1) was adjusted to 18%, and an assembly of molded products 31 was produced.

1. 5 Preparation of Assemblies of Comparative Molding Materials 11 to 13

The press conditions at the time of producing the molding material in 1. 1 were weakened, and a portion having a low coverage of the thermoplastic resin to the carbon fibers, which was in the vicinity of an end material at the time of obtaining the random mat molded product, was taken out and cut to obtain a comparative molding material 11. One was arbitrarily taken out. As a result, it had the shape shown in 100-5 of FIG. 6. The fiber volume ratio (Vf) of the assembly of the comparative molding material 11 was 10%.

Comparative molding materials 12 and 13 were produced in the same manner as in the case of the comparative molding material 11 with the exception that the end material at the time of obtaining the molded product was selected and adjusted so that the fiber volume ratio (Vf) was 25% and 40%, respectively. One was arbitrarily taken out in each case. As a result, it had the shape shown in 100-5 of FIG. 6.

1. 6 Preparation of Comparative Molding Materials 21 to 23 p-Hydroxybenzoic acid 2-hexyldecyl ester (Exceparl HD-PB manufactured by KAO Corporation) was used as an impregnation aid, and this was emulsified so as to give a nonvolatile content of 12% by mass. PAN-based carbon fiber filaments (corresponding to STS40-24K manufactured by Toho Tenax Co., Ltd., fiber diameter: 7.0 μm, the number of filaments: 24000, tensile strength: 4000 MPa) as a carbon fiber bundle were allowed to pass through the resulting solution. Thereafter, the solution excessively adhered to the carbon fiber bundle was removed by nip rolls. Further, the carbon fiber bundle to which the impregnation aid was adhered was allowed to pass through a hot-air drying oven heated at 180° C., over 2 minutes, thereby drying it to obtain an easily impregnatable carbon fiber bundle. The easily impregnatable carbon fiber bundle was allowed to pass along two metallic rolls having a diameter of 60 mm and heated at 200° C., thereby performing heat treatment again to obtain an easily impregnatable carbon fiber bundle in which the impregnation aid was more evenly adhered to the carbon fiber bundle.

Then, the easily impregnatable carbon fiber bundle obtained above was coated with polyamide 6 (manufactured by Ube Industries, Ltd.: UBE Nylon) using a crosshead die for electrical-wire coating having an outlet diameter of 3 mm and cut to a length of 6 mm to obtain a comparative molding material 21 as core-sheath type pellets having a carbon fiber content of 20% by mass (the amount of the polyamide 66 was 393.6 parts by mass based on 100 parts by mass of the carbon fibers), a diameter of 3.2 mm and a length of 6 mm, suitable for injection molding and as shown in FIG. 7.

The form of the molding material shown in the comparative molding material 21 was a cylindrical body having plane $A_2$ facing a plane $A_1$. However, one or more cross sections of the carbon fibers were not observed in any one of faces $B_i$.

Further, comparative molding materials 22 and 23 were prepared by changing the fiber volume ratio (Vf) of the comparative molding material 21.

1. 7 Comparative Molding Material 3

A molding material was prepared in the same manner as in 1. 1 with the exceptions that when the random mat molding material was produced, the coverage of the thermoplastic resin to the carbon fibers was decreased to 75% by performing pressing at 2 MPa for 1 minute and that the fiber volume ratio (Vf) was changed to 40%, and an assembly of comparative molding materials 3 was produced. One was arbitrarily taken out from the assembly of the comparative molding materials 3. As a result, it had the shape shown in 100-6 of FIG. 6.

1. 8 Comparative Molding Material 4

The thermoplastic resin was additionally put into the assembly of the molding material 100-1 obtained in "1. 1", followed by pulverization to obtain a molding material having a fiber volume ratio (Vf) of 18% and a weight average fiber length of 0.5 mm.

1. 9 Comparative Molding Material 5

Glass fibers having a fiber length of 13 mm and a fiber diameter of 10 μm were sandwiched between polypropylene (PP) (melting point: 165° C., decomposition temperature: 230° C.) resin sheets as a matrix resin so as to contain 33% by the fiber volume ratio (Vf) of the glass fibers to prepare a square plate-like molded article having a thickness of 3.2 mm and a length of one side of 500 mm, using a sheet for stamping molding (fiber areal weight: 2000 g, thickness: 1.7 mm) This was cut to a square shape having a length of one side of 50 mm to obtain a comparative molding material 5.

1. 10 Comparative Molding Material 6

A mixed sheet obtained by mixing 33% (Vf) of a carbon fiber mat (fiber length: 100 mm, fiber diameter: 9 μm) and 67% (Vf) of PET was heated and pressurized, and layered on a carbon fiber mat by melting PET (polyethylene terephthalate) to continuously produce a fiber-reinforced composite sheet. This sheet was cut to 5 mm square by a sheet pelletizer to obtain a comparative molding material 6.

2. Preparation of Molded Product

Example 1

As described in the following Table 3, using 23% by weight of the molding material 100-1 as the first molding material, 10% by weight of the comparative molding material 13 as the second molding material and 67% by weight of nylon 6 resin (PA 6) "UBE Nylon" (registered trade mark) 1015B pellets manufactured by Ube Industries, Ltd., a molded product (dumbbell-shaped test piece) was prepared by the molding method shown in Table 3. As conditions for preparing the dumbbell test piece, the resin temperature was 300° C., the back pressure was 10 MPa, and the number of rotations of a screw was 80 rpm.

Examples 2 to 13 and Comparative Examples 1 to 13

Molded products were prepared in the same manner as in Example 1 with the exception that the molding materials shown in the following Tables 3 to 6.

However, for conditions of an injection molding machine in Comparative Examples 7 and 8, plasticizing conditions were weakened to perform adjustment so that the fiber length is left somewhat long, thereby preparing dumbbell-shaped test pieces. Further, in Examples 12 and 13 applying extrusion molding, preparation conditions described later were used.

3. Evaluation Tests and Results Thereof (1) Shape of Molding Material

The form of the molding materials 100-1, 100-2 and 100-3 is a nearly rectangular parallelepiped having the plane $A_2$ facing the plane $A_1$, and one or more cross sections of the carbon fibers are observed in any face $B_i$, and the number of the cross sections of the carbon fibers per unit area observed in the face $B_i$ is twice or more the number of the cross sections of the carbon fibers per unit area observed in the plane $A_1$. In this embodiment, it distributes within a range of 380 to 650 times. This is because the molding material is obtained by cutting the random mat molded product in which the carbon fibers are two-dimensionally randomly oriented.

The results thereof are described in Table 1 and Table 2.

(2) Coverage of Thermoplastic Resin of Molding Material

With respect to the thermoplastic resin impregnation rate of the molding materials 100-1, 100-2 and 100-3, the ratio of the fibers in which 50% or more of an outer peripheral surface of each carbon fiber was coated with the thermoplastic resin was from 80 to 100% to the total carbon fibers. For the molding materials 100-1, 100-2 and 100-3 and the other molding materials, the results thereof are described in Table 1 and Table 2.

(3) Weight Average Fiber Length of Carbon Fibers Contained in Molding Material

A specimen of a molding material was placed in a crucible and heated at 550° C. for 1.5 hours under an oxygen-containing atmosphere to burn and remove a resin component. Remaining carbon fibers were put into water containing a surfactant, followed by sufficient stirring with ultrasonic vibration. A dispersion stirred was randomly collected with a measuring spoon to obtain a sample for evaluation, and the length of 100 fibers was measured by an image analyzer Luzex AP manufactured by Nireco Corporation to determine the weight average fiber length of the carbon fibers.

The results thereof are described in Table 1 and Table 2.

(4) Evaluation of Dispersion Parameter and Fiber Length

When a molding material is injection molded, a resin composition after plasticized and before injected into a mold is partially cut out, and the resin composition cut out is embedded in an epoxy resin. A cut face of a fiber-reinforced thermoplastic resin molded product is polished to prepare a sample for observation.

The cut face of the fiber-reinforced thermoplastic resin molded product obtained by polishing is observed under an optical microscope, and ten places having a range of 0.1 mm×0.1 mm are randomly selected. The number of carbon fibers contained within that range is measured. Taking the average value of the numbers of the carbon fibers in the ten places selected as A and a standard deviation as S, the dispersion parameter is determined by the following formula:

Dispersion parameter=100×$S/A$(unit:%)

Further, as a sample for measuring the dispersion parameter of the resin composition, a part positioned as near a center of the resin composition as possible was used, avoiding an end part thereof.

Plasticization was performed until the dispersion parameter of the resin composition reached 0 to 10%, and the resulting resin composition was placed in a crucible and heated at 550° C. for 1.5 hours under an oxygen-containing atmosphere to burn and remove a resin component. Remaining carbon fibers were put into water containing a surfactant, followed by sufficient stirring with ultrasonic vibration. A dispersion stirred was randomly collected with a measuring spoon to obtain a sample for evaluation, and the length of 100 fibers was measured by an image analyzer Luzex AP manufactured by Nireco Corporation to calculate the weight average fiber length.

In general, when the fiber length of respective carbon fibers is taken as Li, the number average fiber length Ln and the weight average fiber length Lw in a molding material are determined by the following formula:

Number average fiber length $Ln=\Sigma Li/n$

Weight average fiber length $Lw=(\Sigma Li^2)/(\Sigma Li)$

Also for the carbon fibers in these experimental examples, the weight average fiber length Lw was determined by the above-mentioned formula.

The results thereof are described in Table 1 and Table 2.

Incidentally, in the molding materials 100-1, 100-2, 100-3, 100-4 and 31 and the comparative molding materials 11, 12, 13, 21, 22, 23, 3 and 6, the carbon fibers having a fiber length of 2 mm or more were contained, and in the comparative molding material 4, the carbon fibers having a fiber length of 2 mm or more were not contained. In the comparative molding material 5, the glass fibers having a fiber length of 2 mm or more were contained.

(5) Minimum Circumscribed Circle Diameter was Measured as Size of Respective Molding Materials Constituting Assembly An assembly of molding materials is passed through a vibrating sieve, and classified into less than 8 mm, 8 to 20 mm and exceeding 20 mm A pulverized material which has passed through a sieve having a certain opening size herein indicates that the minimum circumscribed circle diameter thereof is equal to or less than the opening of the sieve.

The results thereof are described in the columns of "First Molding Material" in Table 3, Table 4, Table 5 and Table 6.

(6) Length of Carbon Fibers Contained in Molded Product

A molded product obtained was placed in a crucible and heated at 550° C. for 1.5 hours under an oxygen-containing atmosphere to burn and remove a resin component. Remaining carbon fibers were put into water containing a surfactant, followed by sufficient stirring with ultrasonic vibration. A dispersion stirred was randomly collected with a measuring spoon to obtain a sample for evaluation, and the length of 100 fibers was measured by an image analyzer Luzex AP manufactured by Nireco Corporation to calculate the weight average fiber length of the carbon fibers.

The results thereof are described in Table 3, Table 4, Table 5 and Table 6.

(7) Mechanical Characteristics of Molded Product

A tensile test was performed to a dumbbell-shaped test piece with reference to ISO 527 to measure the tensile strength and the tensile modulus. The tensile test was performed at a test speed of 10 mm/min using an injection molding machine (JSW 180H manufactured by The Japan Steel Works, Ltd.), a test piece mold for measuring physical properties (specified in ISO 527, tensile test piece having a thickness of 2 mm, mold temperature: 80° C.) and Type 5982 manufactured by Instron Corporation as a testing machine.

As shown in Table 3 and Table 4, the molded products having excellent appearance and mechanical properties could be obtained in all Examples.

The reason for this is considered to be that even when the plasticizing conditions are mild, the use of the molding material in which the ratio of the number of the fibers in which 50% or more of an outer peripheral surface of each carbon fiber is coated with the thermoplastic resin as the matrix resin is from 80 to 100% causes the carbon fibers to be sufficiently dispersed in the thermoplastic resin, thereby leaving the fiber length longer.

(8) Evaluation of Surface Appearance of Molded Product

Surface appearance of a molded product obtained was observed. The case where a mass of fibrous material having a diameter of 3 mm or more and an air bubble were not confirmed on a surface thereof was evaluated as ○ (excellent), and the case where a mass of fibrous material was confirmed was evaluated as x (bad). In Comparative Example 6, the comparative molding material 22 having a low coverage was used, and the plasticizing conditions were weakened to perform adjustment so that the fiber length was left rather long. The appearance thereof is therefore deteriorated.

(9) Supply State of Carbon Fibers

For a molding material, a supply state of carbon fibers was observed, and evaluated as follows. The results thereof are described in Table 3, Table 4, Table 5 and Table 6. Meanwhile, this evaluation is evaluation for the first molding material in Table 3, Table 4, Table 5 and Table 6.

Excellent: a state where the fibers in the molding material do not fall out from the resin and are supplied together Good: a state where the fibers in the molding material sometimes fall out from the resin, but it causes no problem in practical use Bad: a state where the fibers in the molding material fall out from the resin and are less likely to be supplied.

(10) Conditions of Extrusion Molding

In Examples, as conditions at the time when extrusion molding was performed, the molding materials described in Table 4 (when a plurality of kinds of molding materials were used, after dry blended) were each melt kneaded and extruded through a TEX 90α type twin-screw extruder (manufactured by The Japan Steel Works, Ltd.) in which the cylinder temperature was set to 280° C., and the number of rotations of a screw was set to 160 rpm.

TABLE 1

|  |  |  | Molding Material 100-1 | Molding Material 100-2 | Molding Material 100-3 | Molding Material 100-4 | Molding Material 31 |
|---|---|---|---|---|---|---|---|
| Molding Material | Carbon Fiber | Weight Average Fiber Length (mm) | 2.9 | 2.9 | 2.9 | 2.9 | 2.9 |
|  |  | Coverage Factor (*1) | 85% | 85% | 85% | 95% | 85% |
|  |  | Thermoplastic Resin | PA6 | PA6 | PA6 | PA6 | PA6 |
|  |  | Shape of Molding Material (Shape of Arbitral One Selected from Assembly) | FIG. 6 100-1 | FIG. 6 100-2 | FIG. 6 100-3 | FIG. 6 100-4 | FIG. 6 100-1 |
|  | Number of Carbon Fiber Cross Sections Observed (/mm$^2$) | Plane $A_1$ | 3 | 2 | 4 | 3 | 2 |
|  |  | Plane $A_2$ | 4 | 5 | 3 | 5 | 3 |
|  |  | Average Value of Faces $B_1$-$B_n$ | 2000 | 1900 | 1950 | 1890 | 1000 |
| Resin Composition Dispersion Parameter and Weight Average Fiber Length*2) |  | Dispersion Parameter | 2% | 2% | 2% | 2% | 2% |
|  |  | Weight Average Fiber Length (mm) | 1.5 | 1.5 | 1.5 | 1.6 | 1.6 |

|  |  |  | Comp. Molding Material 11 | Comp. Molding Material 12 | Comp. Molding Material 13 | Comp. Molding Material 21 | Comp. Molding Material 22 |
|---|---|---|---|---|---|---|---|
| Molding Material | Carbon Fiber | Weight Average Fiber Length (mm) | 2.9 | 2.9 | 2.9 | 6 | 6 |
|  |  | Coverage Factor (*1) | 40% | 40% | 40% | 3% | 3% |
|  |  | Thermoplastic Resin | PA6 | PA6 | PA6 | PA6 | PA6 |
|  |  | Shape of Molding Material (Shape of Arbitral One Selected from Assembly) | FIG. 6 100-5 | FIG. 6 100-5 | FIG. 6 100-5 | FIG. 7 | FIG. 7 |
|  | Number of Carbon Fiber Cross Sections Observed (/mm$^2$) | Plane $A_1$ | 3 | 3 | 3 | 6380 | 8700 |
|  |  | Plane $A_2$ | 4 | 4 | 4 | 6380 | 8600 |
|  |  | Average Value of Faces $B_1$-$B_n$ | 800 | 1200 | 2000 | 0 | 0 |
| Resin Composition Dispersion Parameter and Weight Average Fiber Length*2) |  | Dispersion Parameter | 0.02% | 0.02% | 2% | 2% | 2% |
|  |  | Weight Average Fiber Length (mm) | 1 | 1 | 1.0 | 0.9 | 0.9 |

TABLE 1-continued

| | | | Comp. Molding Material 23 | Comp. Molding Material 3 | Comp. Molding Material 4 |
|---|---|---|---|---|---|
| Molding Material | Carbon Fiber | Weight Average Fiber Length (mm) | 6 | 2.9 | 0.5 |
| | | Coverage Factor (*1) | 3% | 75% | 85% |
| | | Thermoplastic Resin | PA6 | PA6 | PA6 |
| | | Shape of Molding Material (Shape of Arbitral One Selected from Assembly) | FIG. 7 | FIG. 6 100-6 | — |
| | Number of Carbon Fiber Cross Sections Observed (/mm²) | Plane $A_1$ | 9000 | 4 | — |
| | | Plane $A_2$ | 9000 | 4 | — |
| | | Average Value of Faces $B_1$-$B_n$ | 0 | 1870 | — |
| Resin Composition Dispersion Parameter and Weight Average Fiber Length*2) | | Dispersion Parameter | 2% | 2% | 2% |
| | | Weight Average Fiber Length (mm) | 0.8 | 1.2 | 0.5 |

(*1) The ratio of carbon fibers in which 50% or more of an outer peripheral surface of each carbon fiber was coated with a thermoplastic resin as a matrix resin
*2) The weight average fiber length of carbon fibers left in a resin composition when each molding material was melt kneaded until the dispersion parameter reached the above-mentioned value

TABLE 2

| | | | Comparative Molding Material 5 | Comparative Molding Material 6 |
|---|---|---|---|---|
| Molding Material | Fiber | Kind of Fiber | Glass fiber | Carbon fiber |
| | | Weight Average Fiber Length | About 10 mm | About 4 mm |
| | | Coverage (*) | 70% | 55% |
| | Thermoplastic Resin | | PP | PET |
| | Shape of Molding Material (Shape of Arbitrary One Selected from Assembly) | | Square shape (each side: 50 mm) | Square shape (each side: 5 mm) |
| | Number of Carbon Fiber Cross Sections Observed (/mm²) | Plane $A_1$ | 3 | 5 |
| | | Plane $A_2$ | 4 | 6 |
| | | Average Value of Faces $B_1$-$B_n$ | 1820 | 1800 |
| Resin Composition Dispersion Parameter and Weight Average Fiber Length (*2) | | Dispersion Parameter | 2% | 2% |
| | | Weight Average Fiber Length (mm) | 0.8 | 0.2 |

*1) The ratio of carbon fibers in which 50% or more of an outer peripheral surface of each carbon fiber was coated with a thermoplastic resin as a matrix resin
(*2) The weight average fiber length of carbon fibers left in a resin composition when each molding material was melt kneaded until the dispersion parameter reached the above-mentioned value

TABLE 3

| | | | Example 1 | Example 2 | Example 3 |
|---|---|---|---|---|---|
| Whole Molding Material | Kind | First Molding Material | Molding material 100-1 | Molding material 100-1 | Molding material 100-1 |
| | Fiber Volume Ratio of First Molding Material (Vf1) (%) | | 33 | 33 | 33 |
| | Weight Ratio (%) | | 23 | 30 | 38 |
| | V1 Volume Ratio of First Molding Material Based on Whole Molding Material (%) | | 20 | 27 | 35 |

TABLE 3-continued

|  |  |  |  |  |  |
|---|---|---|---|---|---|
|  | Weight Ratio of Molding Material Having Diameter of Minimum Circumscribed Circle of Less than 8 mm |  | 46.1% | 45.9% | 46.2% |
|  | Weight Ratio of Molding Material Having Diameter of Minimum Circumscribed Circle of 8 to 20 mm |  | 53.9% | 54.1% | 53.8% |
|  | Kind | Second Molding Material | Comp. molding material 13 | Comp. molding material 13 | Comp. molding material 13 |
|  | Fiber Volume Ratio of Second Molding Material (Vf2) (%) |  | 40 | 40 | 40 |
|  | Weight Ratio (%) |  | 10 | 13 | 16 |
|  | V2 Volume Ratio of Second Molding Material Based on Whole Molding Material (%) |  | 8 | 11 | 14 |
|  | Kind of Thermoplastic Resin | Third Molding Material | PA6 | PA6 | PA6 |
|  | Weight Ratio (%) |  | 67 | 57 | 46 |
|  | V3 Volume Ratio of Third Molding Material Based on Whole Molding Material (%) |  | 72 | 61 | 51 |
|  | Molding Method |  | Injection molding | Injection molding | Injection molding |
| Molded Product | Weight Average Fiber Length (mm) |  | 1.1 | 1.1 | 1.1 |
|  | Tensile Strength (MPa) |  | 247 | 270 | 300 |
|  | Appearance |  | ○ (Excellent) | ○ (Excellent) | ○ (Excellent) |
|  | Vf (%) |  | 9.7 | 13.3 | 16.9 |
|  | Resin Density |  | 1.1 | 1.1 | 1.1 |
|  | Fiber Density g/cm$^3$ |  | 1.8 | 1.8 | 1.8 |
|  | Vfp × (V1 + V2 + V3)/(V1 × Vf1 + V2 × Vf2) Average for 5 Molded Products |  | 0.98 | 0.98 | 0.98 |
|  | Supply State of Carbon Fibers (*1) |  | Excellent | Excellent | Excellent |
|  | Variation Value of Vf When 5 Molded Products Are Produced (%) |  | 11 | 12 | 11 |

|  |  |  | Example 4 | Example 5 | Example 6 |
|---|---|---|---|---|---|
| Whole Molding Material | Kind | First Molding Material | Molding material 100-1 | Molding material 100-2 | Molding material 100-2 |
|  | Fiber Volume Ratio of First Molding Material (Vf1) (%) |  | 33 | 34 | 34 |
|  | Weight Ratio (%) |  | 46 | 23 | 30 |
|  | V1 Volume Ratio of First Molding Material Based on Whole Molding Material (%) |  | 43 | 20 | 27 |
|  | Weight Ratio of Molding Material Having Diameter of Minimum Circumscribed Circle of Less than 8 mm |  | 47.0% | 46.5% | 47.2% |
|  | Weight Ratio of Molding Material Having Diameter of Minimum Circumscribed Circle of 8 to 20 mm |  | 53.0% | 53.5% | 52.8% |
|  | Kind | Second Molding Material | Comp. molding material 13 | Comp. molding material 13 | Comp. molding material 13 |
|  | Fiber Volume Ratio of Second Molding Material (Vf2) (%) |  | 40 | 40 | 40 |
|  | Weight Ratio (%) |  | 20 | 10 | 13 |
|  | V2 Volume Ratio of Second Molding Material Based on Whole Molding Material (%) |  | 18 | 8 | 11 |
|  | Kind of Thermoplastic Resin | Third Molding Material | PA6 | PA6 | PA6 |
|  | Weight Ratio (%) |  | 34 | 67 | 57 |
|  | V3 Volume Ratio of Third Molding Material Based on Whole Molding Material (%) |  | 39 | 72 | 61 |
|  | Molding Method |  | Injection molding | Injection molding | Injection molding |
| Molded Product | Weight Average Fiber Length (mm) |  | 1.1 | 1.1 | 1.1 |
|  | Tensile Strength (MPa) |  | 335 | 247 | 270 |
|  | Appearance |  | ○ (Excellent) | ○ (Excellent) | ○ (Excellent) |
|  | Vf (%) |  | 20.8 | 9.7 | 13.3 |
|  | Resin Density |  | 1.1 | 1.1 | 1.1 |
|  | Fiber Density g/cm$^3$ |  | 1.8 | 1.8 | 1.8 |
|  | Vfp × (V1 + V2 + V3)/(V1 × Vf1 + V2 × Vf2) Average for 5 Molded Products |  | 0.97 | 0.96 | 0.96 |
|  | Supply State of Carbon Fibers (*1) |  | Excellent | Excellent | Excellent |
|  | Variation Value of Vf When 5 Molded Products Are Produced (%) |  | 13 | 11 | 12.0 |

(*1) Supply State of Carbon Fibers: The degree of such a phenomenon that carbon fibers remain in a hopper or float

TABLE 4

|  |  |  | Example 7 | Example 8 | Example 9 | Example 10 |
|---|---|---|---|---|---|---|
| Whole Molding Material | Kind | First Molding Material | Molding material 100-2 | Molding material 100-1 | Molding material 100-4 | Molding material 100-1 |
|  | Fiber Volume Ratio of First Molding Material (Vf1) (%) |  | 34 | 34 | 32 | 33 |
|  | Weight Ratio (%) |  | 38 | 23 | 23 | 100 |
|  | V1 Volume Ratio of First Molding Material Based on Whole Molding Material (%) |  | 35 | 20 | 20 | 100 |
|  | Weight Ratio of Molding Material Having Diameter of Minimum Circumscribed Circle of Less than 8 mm |  | 45.5% | 88.0% | 49.3% | 46.3% |
|  | Weight Ratio of Molding Material Having Diameter of Minimum Circumscribed Circle of 8 to 20 mm |  | 54.5% | 12.0% | 50.7% | 53.7% |
|  | Kind | Second Molding Material | Comp. molding material 13 | Comp. molding material 13 | Comp. molding material 13 | Not used |
|  | Fiber Volume Ratio of Second Molding Material (Vf2) (%) |  | 40 | 40 | 40 | 0 |
|  | Weight Ratio (%) |  | 16 | 10 | 10 | Not used |
|  | V2 Volume Ratio of Second Molding Material Based on Whole Molding Material (%) |  | 14 | 8 | 8 | 0 |
|  | Kind of Thermoplastic Resin | Third Molding Material | PA6 | PA6 | PA6 | Not used |
|  | Weight Ratio (%) |  | 46 | 67 | 67 | Not used |
|  | V3 Volume Ratio of Third Molding Material Based on Whole Molding Material (%) |  | 51 | 72 | 71 | 0 |
|  | Molding Method |  | Injection molding | Injection molding | Injection molding | Injection molding |
| Molded Product | Weight Average Fiber Length (mm) |  | 1.1 | 0.9 | 1.1 | 1.1 |
|  | Tensile Strength (MPa) |  | 300 | 232 | 249 | 254 |
|  | Appearance |  | ○ (Excellent) | ○ (Excellent) | ○ (Excellent) | ○ (Excellent) |
|  | Vf (%) |  | 16.9 | 9.7 | 9.7 | 32.9 |
|  | Resin Density |  | 1.1 | 1.1 | 1.1 | 1.1 |
|  | Fiber Density g/cm³ |  | 1.8 | 1.8 | 1.8 | 1.8 |
|  | Vfp × (V1 + V2 + V3)/(V1 × Vf1 + V2 × Vf2) Average for 5 Molded Products |  | 0.97 | 0.96 | 0.99 | 1.00 |
|  | Supply State of Carbon Fibers (*1) |  | Excellent | Excellent | Excellent | Excellent |
|  | Variation Value of Vf When 5 Molded Products Are Produced (%) |  | 11 | 11 | 14 | 15 |

|  |  |  | Example 11 | Example 12 | Example 13 |
|---|---|---|---|---|---|
| Whole Molding Material | Kind | First Molding Material | Molding material 100-1 | Molding material 31 | Molding material 100-1 |
|  | Fiber Volume Ratio of First Molding Material (Vf1) (%) |  | 33 | 18 | 33 |
|  | Weight Ratio (%) |  | 41 | 100 | 23 |
|  | V1 Volume Ratio of First Molding Material Based on Whole Molding Material (%) |  | 37 | 100 | 20 |
|  | Weight Ratio of Molding Material Having Diameter of Minimum Circumscribed Circle of Less than 8 mm |  | 45.7% | 46.3% | 46.1% |
|  | Weight Ratio of Molding Material Having Diameter of Minimum Circumscribed Circle of 8 to 20 mm |  | 54.3% | 53.7% | 53.9% |
|  | Kind | Second Molding Material | Comp. molding material 4 | Not used | Comp. molding material 13 |
|  | Fiber Volume Ratio of Second Molding Material (Vf2) (%) |  | 18 | 0 | 40 |
|  | Weight Ratio (%) |  | 25 | Not used | 10 |
|  | V2 Volume Ratio of Second Molding Material Based on Whole Molding Material (%) |  | 25 | 0 | 8 |

TABLE 4-continued

|  |  |  |  |  |  |
|---|---|---|---|---|---|
|  | Kind of Thermoplastic Resin | Third Molding Material | PA6 | Not used | PA6 |
|  | Weight Ratio (%) |  | 34 | Not used | 67 |
|  | V3 |  | 38 | 0 | 72 |
|  | Volume Ratio of Third Molding Material Based on Whole Molding Material (%) |  |  |  |  |
|  | Molding Method |  | Injection molding | Extrusion molding | Extrusion molding |
| Molded Product | Weight Average Fiber Length (mm) |  | 0.95 | 0.29 | 0.29 |
|  | Tensile Strength (MPa) |  | 261 | — | — |
|  | Appearance |  | ○ (Excellent) | ○ (Excellent) | ○ (Excellent) |
|  | Vf (%) |  | 16.8 | 16.9 | 9.7 |
|  | Resin Density |  | 1.1 | 1.1 | 1.1 |
|  | Fiber Density g/cm³ |  | 1.8 | 1.8 | 1.8 |
|  | Vfp × (V1 + V2 + V3)/(V1 × Vf1 + V2 × Vf2) Average for 5 Molded Products |  | 1.00 | 0.94 | 0.98 |
|  | Supply State of Carbon Fibers (*1) |  | Excellent | Excellent | Excellent |
|  | Variation Value of Vf When 5 Molded Products Are Produced (%) |  | 13 | 10 | 11 |

(*1) Supply State of Carbon Fibers: The degree of such a phenomenon that carbon fibers remain in a hopper or float

TABLE 5

|  |  |  | Comparative Example 1 | Comparative Example 2 | Comparative Example 3 |
|---|---|---|---|---|---|
| Whole Molding Material | Kind | First Molding Material | Comparative molding material 11 | Comparative molding material 12 | Comparative molding material 13 |
|  | Fiber Volume Ratio of First Molding Material (Vf1) (%) |  | 10 | 25 | 40 |
|  | Weight Ratio (%) |  | 100 | 100 | 100 |
|  | V1 |  | 100 | 100 | 100 |
|  | Volume Ratio of First Molding Material Based on Whole Molding Material (%) |  |  |  |  |
|  | Weight Ratio of Molding Material Having Diameter of Minimum Circumscribed Circle of Less than 8 mm |  | 47.0% | 48.0% | 45.5% |
|  | Weight Ratio of Molding Material Having Diameter of Minimum Circumscribed Circle of 8 to 20 mm |  | 53.0% | 52.0% | 54.5% |
|  | Kind | Second Molding Material | Not used | Not used | Not used |
|  | Fiber Volume Ratio of Second Molding Material (Vf2) (%) |  | 0 | 0 | 0 |
|  | Weight Ratio (%) |  | Not used | Not used | Not used |
|  | V2 |  | 0 | 0 | 0 |
|  | Volume Ratio of Second Molding Material Based on Whole Molding Material (%) |  |  |  |  |
|  | Kind of Thermoplastic Resin | Third Molding Material | Not used | Not used | Not used |
|  | Weight Ratio (%) |  | Not used | Not used | Not used |
|  | V3 |  | 0 | 0 | 0 |
|  | Volume Ratio of Third Molding Material Based on Whole Molding Material (%) |  |  |  |  |
|  | Molding Method |  | Injection molding | Injection molding | Injection molding |
| Molded Product | Weight Average Fiber Length (mm) |  | 0.6 | 0.6 | 0.5 |
|  | Tensile Strength (MPa) |  | 210 | 240 | 300 |
|  | Appearance |  | ○ (Excellent) | ○ (Excellent) | ○ (Excellent) |
|  | Vf (%) |  | 6.4 | 13.3 | 20.8 |
|  | Resin Density |  | 1.1 | 1.1 | 1.1 |
|  | Fiber Density g/cm³ |  | 1.8 | 1.8 | 1.8 |
|  | Vfp × (V1 + V2 + V3)/(V1 × Vf1 + V2 × Vf2) Average for 5 Molded Products |  | 0.64 | 0.53 | 0.52 |
|  | Supply State of Carbon Fibers (*1) |  | Bad | Bad | Bad |
|  | Variation Value of Vf When 5 Molded Products Are Produced (%) |  | 20 | 18 | 17.0 |

TABLE 5-continued

|  |  |  | Comparative Example 4 | Comparative Example 5 | Comparative Example 6 |
|---|---|---|---|---|---|
| Whole Molding Material | Kind | First Molding Material | Comparative molding material 21 | Comparative molding material 22 | Comparative molding material 22 |
|  | Fiber Volume Ratio of First Molding Material (Vf1) (%) |  | 14 | 27 | 27 |
|  | Weight Ratio (%) |  | 100 | 100 | 100 |
|  | V1 Volume Ratio of First Molding Material Based on Whole Molding Material (%) |  | 100 | 100 | 100 |
|  | Weight Ratio of Molding Material Having Diameter of Minimum Circumscribed Circle of Less than 8 mm |  | 100 | 100 | 100 |
|  | Weight Ratio of Molding Material Having Diameter of Minimum Circumscribed Circle of 8 to 20 mm |  | 0.0% | 0.0% | 0.0% |
|  | Kind | Second Molding Material | Not used | Not used | Not used |
|  | Fiber Volume Ratio of Second Molding Material (Vf2) (%) |  | 0 | 0 | 0 |
|  | Weight Ratio (%) |  | Not used | Not used | Not used |
|  | V2 Volume Ratio of Second Molding Material Based on Whole Molding Material (%) |  | 0 | 0 | 0 |
|  | Kind of Thermoplastic Resin | Third Molding Material | Not used | Not used | Not used |
|  | Weight Ratio (%) |  | Not used | Not used | Not used |
|  | V3 Volume Ratio of Third Molding Material Based on Whole Molding Material (%) |  | 0 | 0 | 0 |
|  | Molding Method |  | Injection molding | Injection molding | Injection molding |
| Molded Product | Weight Average Fiber Length (mm) |  | 0.65 | 0.65 | 0.65 |
|  | Tensile Strength (MPa) |  | 210 | 265 | 271 |
|  | Appearance |  | ○ (Excellent) | ○ (Excellent) | x (Bad) |
|  | Vf (%) |  | 11.8 | 20.8 | 35.1 |
|  | Resin Density |  | 1.1 | 1.1 | 1.1 |
|  | Fiber Density g/cm³ |  | 1.8 | 1.8 | 1.8 |
| Vfp × (V1 + V2 + V3)/(V1 × Vf1 + V2 × Vf2) Average for 5 Molded Products |  |  | 0.86 | 0.77 | 1.30 |
| Supply State of Carbon Fibers (*1) |  |  | Bad | Bad | Bad |
| Variation Value of Vf When 5 Molded Products Are Produced (%) |  |  | 14 | 15 | 15 |

(*1) Supply State of Carbon Fibers: The degree of such a phenomenon that carbon fibers remain in a hopper or float

TABLE 6

|  |  |  | Comparative Example 7 | Comparative Example 8 | Comparative Example 9 | Comparative Example 10 |
|---|---|---|---|---|---|---|
| Whole Molding Material | Kind | First Molding Material | Comp. molding material 22 | Comp. molding material 23 | Comp. molding material 3 | Comp. molding material 13 |
|  | Fiber Volume Ratio of First Molding Material (Vf1) (%) |  | 27 | 34 | 40 | 40 |
|  | Weight Ratio (%) |  | 100 | 100 | 100 | 63 |
|  | V1 Volume Ratio of First Molding Material Based on Whole Molding Material (%) |  | 100 | 100 | 100 | 59 |
|  | Weight Ratio of Molding Material Having Diameter of Minimum Circumscribed Circle of Less than 8 mm |  | 100 | 100 | 47.5% | 45.7% |
|  | Weight Ratio of Molding Material Having Diameter of Minimum Circumscribed Circle of 8 to 20 mm |  | 0.0% | 0.0% | 52.5% | 54.3% |
|  | Kind | Second Molding Material | Not used | Not used | Not used | Comp. molding material 4 |
|  | Fiber Volume Ratio of Second Molding Material (Vf2) (%) |  | 0 | 0 | 0 | 18 |
|  | Weight Ratio (%) |  | Not used | Not used | Not used | 25 |
|  | V2 Volume Ratio of Second Molding Material Based on Whole Molding Material (%) |  | 0 | 0 | 0 | 27 |

TABLE 6-continued

|  |  |  |  |  |  |  |
|---|---|---|---|---|---|---|
|  | Kind of Thermoplastic Resin | Third Molding Material | Not used | Not used | Not used | PA6 |
|  | Weight Ratio (%) |  | Not used | Not used | Not used | 12 |
|  | V3 |  | 0 | 0 | 0 | 14 |
|  | Volume Ratio of Third Molding Material Based on Whole Molding Material (%) |  |  |  |  |  |
|  | Molding Method |  | Injection molding | Injection molding | Injection molding | Injection molding |
| Molded Product | Weight Average Fiber Length (mm) |  | 1.1 | 1.1 | 0.7 | 0.82 |
|  | Tensile Strength (MPa) |  | 210 | 210 | 220 | 270 |
|  | Appearance |  | x (Bad) | x (Bad) | ○ (Excellent) | x (Bad) |
|  | Vf (%) |  | 20.8 | 47.8 | 6.4 | 16.9 |
|  | Resin Density |  | 1.1 | 1.1 | 1.1 | 1.1 |
|  | Fiber Density g/cm³ |  | 1.8 | 1.8 | 1.8 | 1.8 |
|  | Vfp × (V1 + V2 + V3)/(V1 × Vf1 + V2 × Vf2) Average for 5 Molded Products |  | 0.77 | 1.41 | 0.16 | 0.59 |
|  | Supply State of Carbon Fibers (*1) |  | Bad | Bad | Bad | Bad |
|  | Variation Value of Vf When 5 Molded Products Are Produced (%) |  | 18 | 18 | 20 | 18 |

|  |  |  | Comparative Example 11 | Comparative Example 12 | Comparative Example 13 |
|---|---|---|---|---|---|
| Whole Molding Material | Kind | First Molding Material | Comp. molding material 4 | Comp. molding material 5 | Comp. molding material 6 |
|  | Fiber Volume Ratio of First Molding Material (Vf1) (%) |  | 18 | 33 | 33 |
|  | Weight Ratio (%) |  | 100 | 100 | 100 |
|  | V1 |  | 100 | 100 | 100 |
|  | Volume Ratio of First Molding Material Based on Whole Molding Material (%) |  |  |  |  |
|  | Weight Ratio of Molding Material Having Diameter of Minimum Circumscribed Circle of Less than 8 mm |  | 100.0% | 0 | 100 |
|  | Weight Ratio of Molding Material Having Diameter of Minimum Circumscribed Circle of 8 to 20 mm |  | 0.0% | 100 | 0 |
|  | Kind | Second Molding Material | Not used | Not used | Not used |
|  | Fiber Volume Ratio of Second Molding Material (Vf2) (%) |  | 0 | 0 | 0 |
|  | Weight Ratio (%) |  | Not used | Not used | Not used |
|  | V2 |  | 0 | 0 | 0 |
|  | Volume Ratio of Second Molding Material Based on Whole Molding Material (%) |  |  |  |  |
|  | Kind of Thermoplastic Resin | Third Molding Material | Not used | Not used | Not used |
|  | Weight Ratio (%) |  | Not used | Not used | Not used |
|  | V3 |  | 0 | 0 | 0 |
|  | Volume Ratio of Third Molding Material Based on Whole Molding Material (%) |  |  |  |  |
|  | Molding Method |  | Injection molding | Injection molding | Injection molding |
| Molded Product | Weight Average Fiber Length (mm) |  | 0 | 1.3 | 1.1 |
|  | Tensile Strength (MPa) |  | 240 | 40 | 30 |
|  | Appearance |  | x (Bad) | x (Bad) | x (Bad) |
|  | Vf (%) |  | 16.9 | 22.4 | 27 |
|  | Resin Density |  | 1.1 | 0.9 | 1.35 |
|  | Fiber Density g/cm³ |  | 1.8 | 2.55 | 1.8 |
|  | Vfp × (V1 + V2 + V3)/(V1 × Vf1 + V2 × Vf2) Average for 5 Molded Products |  | 0.97 | 0.68 | 0.82 |
|  | Supply State of Carbon Fibers (*1) |  | Good | Bad | Bad |
|  | Variation Value of Vf When 5 Molded Products Are Produced (%) |  | 10 | 20 | 20 |

(*1) Supply State of Carbon Fibers: The degree of such a phenomenon that carbon fibers remain in a hopper or float Modified Examples In the assembly of the molding materials according to the above-mentioned embodiment, a random mat molded product or a combination of a random mat molded product and a unidirectional fiber-reinforced composite material or the like can also be used as a composite material or a composite material as the raw material for production. Further, the raw material for production is not limited to the above-mentioned constitution, and can be appropriately changed.

Additional Description

The embodiments described above all show preferred specific examples of the present invention.

The numerical values, shapes, materials, constituent elements, arranged positions and connection forms of the constituent elements, steps, order of the steps and the like shown in the embodiments are only examples, and do not intend to limit the present invention. Further, of the constituent elements in the embodiments, the steps not described in the independent claim showing most generic concepts are illustrated as arbitrary constituent elements constituting more preferred forms.

Further, for the purpose of easy understanding of the invention, the scales of the constituent elements of the respective figures mentioned in the respective embodiments are different from the actual ones in some cases. Furthermore, the present invention should not be construed as being limited by the descriptions of the above-mentioned respective embodiments, and can be appropriately changed within a range not departing from the spirit of the present invention.

In addition, in the production apparatus used in the production method of the fiber-reinforced resin composite material, members such as circuit parts and lead wires are present on structural members, driving parts, pipings, electric parts and substrates. For electric wirings and electric circuits, various embodiments can be performed, based on the ordinary knowledge in the art of composite materials and the like, and have no direct relation as the description of the present invention. Accordingly, the description thereof is omitted. Meanwhile, the respective figures shown above are perspective views, and are not necessarily exactly shown.

INDUSTRIAL APPLICABILITY

The molding materials according to the present invention can be widely utilized, for example, as inner plates, outer plates, constituent members and the like of automobiles, railroad vehicles, aircrafts and the like, and moreover, as various electric parts, frames of machines, apparatus and the like, and molding materials for casings and the like.

Although the present invention has been described in details with reference to the specific embodiments, it will be obvious to those skilled in the art that various changes and modifications can be made without departing from the spirit and scope of the present invention.

The present application is based on Japanese Patent Application (No. 2014-009516) filed on Jan. 22, 2014, the contents of which are incorporated herein by reference.

DESCRIPTION OF REFERENCE NUMERALS AND SIGNS

100: Molding material
101: Composite material broken material
102: Cut piece
110: Thermoplastic resin
120: Carbon fiber
121: Single fiber
122: Fiber bundle
200: Cutter
210: Filter
302: Injection molding machine

The invention claimed is:

1. A molding material for injection molding, extrusion molding or pultrusion molding, which contains carbon fibers having a fiber length of 2 mm or more and a thermoplastic resin, wherein
   the carbon fibers are PAN-based carbon fibers,
   (1) the molding material is a solid having a plane $A_1$ and one or more other face $B_i$, one or more cross sections of the carbon fibers are observed in at least one face $B_i$, and the number of the cross sections of the carbon fibers per unit area observed in the face $B_i$ is twice or more the number of the cross sections of the carbon fibers per unit area observed in the plane $A_1$, the carbon fibers are randomly dispersed in a plane direction parallel to the plane $A_1$, and
   (2) a ratio of fibers in which 50% or more of an outer peripheral surface of each carbon fiber is coated with the thermoplastic resin is from 80 to 100% to total carbon fibers, and
   when melt-kneaded to a dispersion parameter of 0 to 10%, the carbon fibers contained in the melt-kneaded molding material has a weight average fiber length of 0.3 mm or more.

2. A method for producing an injection molded product using a first molding material which is the molding material according to claim 1, a second molding material which is an optional carbon-fiber-containing molding material and a third molding material which is an optional thermoplastic resin,
   wherein when an input volume of the first molding material is taken as V1, an input volume of the second molding material is taken as V2, an input volume of the third molding material is taken as V3, a fiber volume ratio of the first molding material is taken as Vf1, a fiber volume ratio of the second molding material is taken as Vf2, and a fiber volume ratio of the molded product is taken as Vfp, Vfp×(V1+V2+V3)/(V1×Vf1+V2×Vf2) is from 0.8 to 1.2,
   wherein Vf1, Vf2 and Vfp are each defined as described below:
   Vf1 represents "the volume of the fibers contained in the first molding material/(the volume of the fibers contained in the first molding material+the volume of the thermoplastic resin contained in the first molding material)";
   Vf2 represents "the volume of the fibers contained in the second molding material/(the volume of the fibers contained in the second molding material+the volume of a thermoplastic resin contained in the second molding material)"; and
   Vfp represents "the volume of the fibers contained in the molded product/(the volume of the fibers contained in the molded product+the volume of the thermoplastic resins contained in the molded product)", and
   a weight average fiber length of the carbon fibers contained molded product is 0.9 mm or more.

3. The method for producing an injection molded product according to claim 2, which is the method for producing the injection molded product according to claim 2 by using the second molding material,
   wherein the carbon fibers contained in the second molding material have an average fiber length of less than 2 mm.

4. A method for continuously producing injection molded products by using the method according to claim 2, wherein the molded products produced have a CV value of the fiber volume ratio, Vfp, of 20% or less.

5. An aggregation of the molding material according to claim 1, comprising:
a molding material having a diameter of a minimum circumscribed circle of a plane having a maximum area in planes of the molding material, the diameter being 8 to 20 mm; and another molding material having a diameter of a minimum circumscribed circle of a plane having a maximum area in planes of the another molding material, the diameter being less than 8 mm.

6. An aggregation of the molding material according to claim 1,
wherein a weight ratio of a molding material having a diameter of a minimum circumscribed circle of a plane having a maximum area in planes of the molding material, the diameter being 8 to 20 mm, to another molding material having a diameter of a minimum circumscribed circle of a plane having a maximum area in planes of the another molding material, the diameter being less than 8 mm, is 30:70 to 70:30.

7. The molding material according to claim 1,
wherein the molding material is obtained by cutting a plate-like molding material precursor with a two-dimensional random orientation.

8. The molding material according to claim 1,
wherein the solid is a solid having a plane $A_2$ facing the plane $A_1$.

* * * * *